US009989963B2

(12) United States Patent
Perkins et al.

(10) Patent No.: US 9,989,963 B2
(45) Date of Patent: Jun. 5, 2018

(54) AUTONOMOUS CONFIDENCE CONTROL

(71) Applicant: Ford Global Technologies, LLC, Dearborn, MI (US)

(72) Inventors: William Paul Perkins, Dearborn, MI (US); David B. Kelley, Monroe, MI (US); Kenneth James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

(21) Appl. No.: 15/073,116

(22) Filed: Mar. 17, 2016

(65) Prior Publication Data
US 2017/0248951 A1 Aug. 31, 2017

Related U.S. Application Data

(63) Continuation-in-part of application No. 15/053,028, filed on Feb. 25, 2016.

(51) Int. Cl.
G05D 1/00 (2006.01)
B60W 10/04 (2006.01)
B60W 50/08 (2012.01)
B60W 10/18 (2012.01)
B60W 10/20 (2006.01)

(52) U.S. Cl.
CPC .......... *G05D 1/0061* (2013.01); *B60W 10/04* (2013.01); *B60W 10/18* (2013.01); *B60W 10/20* (2013.01); *B60W 50/082* (2013.01); *B60W 2420/42* (2013.01); *B60W 2420/52* (2013.01); *B60W 2540/22* (2013.01)

(58) Field of Classification Search
CPC ....... G05D 1/00; G05D 1/0061; B60W 10/04; B60W 10/18; B60W 10/20
USPC .................................................... 701/23, 26
See application file for complete search history.

(56) References Cited

U.S. PATENT DOCUMENTS

| 5,469,356 | A | 11/1995 | Hawkins et al. |
|---|---|---|---|
| 6,151,539 | A | 11/2000 | Bergholz et al. |
| 6,301,542 | B1 | 10/2001 | Kirchberger et al. |
| 6,789,015 | B2 | 9/2004 | Tsuji et al. |

(Continued)

FOREIGN PATENT DOCUMENTS

| DE | 2012112802 A1 | 6/2014 |
|---|---|---|
| DE | 2013225932 A1 | 6/2014 |

(Continued)

OTHER PUBLICATIONS

Hirose et al., "Driving Characteristics of Drivers in a State of Low Alertness when an Autonomous System Changes from Autonomous Driving to Manual Driving", SAE International, Paper No. 2015-01-1407, published Apr. 14, 2015, 2 pages.

(Continued)

*Primary Examiner* — Tan Q Nguyen
(74) *Attorney, Agent, or Firm* — Frank A. MacKenzie; Bejin Bieneman PLC

(57) ABSTRACT

Signals are from a plurality of sources representing aspects of the vehicle and an environment surrounding the vehicle. An autonomous confidence factor is developed based on component confidence levels for at least one of the signals. Control of the vehicle is transitioned between levels of autonomous control based at least in part on the autonomous confidence factor.

16 Claims, 21 Drawing Sheets

(56) References Cited

U.S. PATENT DOCUMENTS

| | | |
|---|---|---|
| 7,966,127 B2 | 6/2011 | Ono et al. |
| 8,078,349 B1 | 12/2011 | Prada Gomez et al. |
| 8,326,784 B2 | 12/2012 | Meers et al. |
| 8,327,061 B2 | 12/2012 | Boldy et al. |
| 8,515,659 B2 | 8/2013 | Kindo et al. |
| 8,606,455 B2 | 12/2013 | Boehringer et al. |
| 8,680,977 B2 | 3/2014 | Okita |
| 8,718,861 B1 | 5/2014 | Montemerlo et al. |
| 8,818,608 B2 | 7/2014 | Cullinane et al. |
| 8,812,186 B2 | 8/2014 | Oh et al. |
| 8,874,301 B1 | 10/2014 | Rao et al. |
| 8,954,217 B1* | 2/2015 | Montemerlo ......... B60W 30/00 701/26 |
| 9,014,915 B2 | 4/2015 | Chatterjee et al. |
| 9,063,543 B2* | 6/2015 | An ..................... G05D 1/0055 |
| 2003/0055563 A1 | 3/2003 | Jonas Lars et al. |
| 2003/0204290 A1 | 10/2003 | Sadler |
| 2007/0286475 A1 | 12/2007 | Sekiguchi |
| 2008/0097699 A1 | 4/2008 | Ono |
| 2008/0319670 A1 | 12/2008 | Yopp et al. |
| 2011/0254675 A1 | 10/2011 | Koehler |
| 2012/0109461 A1 | 5/2012 | Nitta et al. |
| 2012/0212353 A1 | 8/2012 | Fung et al. |
| 2012/0277947 A1* | 11/2012 | Boehringer .......... B60W 30/17 701/23 |
| 2012/0303258 A1 | 11/2012 | Pampus et al. |
| 2013/0124076 A1 | 5/2013 | Bruni et al. |
| 2014/0100189 A1* | 4/2014 | Sawatzki ............ A61K 31/715 514/53 |
| 2014/0297170 A1 | 10/2014 | Sakima et al. |
| 2014/0300479 A1 | 10/2014 | Wolter et al. |
| 2014/0303827 A1* | 10/2014 | Dolgov ................ B60W 30/00 701/23 |
| 2015/0066284 A1 | 3/2015 | Yopp |
| 2015/0066821 A1 | 3/2015 | Nakamura et al. |
| 2015/0070160 A1 | 3/2015 | Davidsson et al. |
| 2015/0088357 A1 | 3/2015 | Yopp |
| 2015/0088358 A1* | 3/2015 | Yopp .................... B60W 10/04 701/23 |
| 2015/0100189 A1 | 4/2015 | Tellis et al. |
| 2015/0106010 A1 | 4/2015 | Martin et al. |
| 2016/0001781 A1 | 1/2016 | Fung et al. |
| 2016/0187879 A1 | 6/2016 | Mere et al. |
| 2016/0252903 A1 | 9/2016 | Prokhorov |
| 2016/0378114 A1 | 12/2016 | Laur |
| 2017/0018190 A1 | 1/2017 | Yamasaki |
| 2017/0110022 A1 | 4/2017 | Gulash |

FOREIGN PATENT DOCUMENTS

| | | |
|---|---|---|
| EP | 2803546 A1 | 11/2014 |
| EP | 2940545 A1 | 11/2015 |
| EP | 3128498 A1 | 2/2017 |
| EP | 3133455 A1 | 2/2017 |
| EP | 3136366 A1 | 3/2017 |
| GB | 2523906 A | 9/2015 |
| JP | 201251441 A | 3/2012 |
| JP | 5083172 B2 | 11/2012 |
| KR | 20140021364 | 2/2014 |
| TW | 201515889 A | 5/2015 |
| WO | 2014191209 A1 | 12/2014 |
| WO | 2015070977 A1 | 5/2015 |
| WO | 2015162784 A1 | 10/2015 |

OTHER PUBLICATIONS

Jaswal et al., "Autonomous Vehicles: The Future of Automobiles", SAE International, Paper No. 2015-28-0100, published Sep. 27, 2015, 1 page.
Lee et al., "Automated Driving Control in Safe Driving Envelope based on Probabilistic Prediction of Surrounding Vehicle Behaviors", SAE International, Paper No. 2015-01-0314, published Apr. 14, 2015, 2 pages.
Llorca et al., "Autonomous Pedestrian Collision Avoidance Using a Fuzzy Steering Controller", DL ACM Digital Library, 2 pages, published in Journal IEEE Transactions on Intelligent Transportation Systems, vol. 12, Issue 2, Jun. 2011.
Merat et al., "Transition to manual: Driver behaviour when resuming control from a highly automated vehicle", Transportation Research Part F 27 (2014) 274-282, www.elsevier.com/locate/trf, 9 pages.
Rupp et al., "Autonomous Driving—A Practical Roadmap", SAE International, Paper No. 2010-01-2335, published Jan. 10, 2010, 2 pages.
Tadesse, "Drowsiness Detection for Driver Assistance", http://hdl.handle.net/11244/11238, Sep. 24, 2014, 2 pages.
UKIPO Search Report for GB1702946.3 dated Aug. 4, 2017 (4 pages).
Non-Final Office Action dated May 16, 2017; U.S. Appl. No. 15/073,093, filed Mar. 17, 2016.
UKIPO Search Report dated Aug. 18, 2017 for GB Patent Application No. GB1702950.5 (6 pages).
Non-Final Office Action for U.S. Appl. No. 15/073,123, dated Dec. 6, 2017 (39 pages).
Final Office Action dated Nov. 15, 2017 for U.S. Appl. No. 15/073,093 (26 pages).
Non-Final Office Action dated Oct. 30, 2017; U.S. Appl. No. 15/073,129.
Non-Final Office Action dated Sep. 7, 2017; U.S. Appl. No. 15/073,137.
Non-Final Office Action dated Apr. 17, 2018 re U.S. Appl. No. 15/073,093.

* cited by examiner

| time (s) | Raw Signal Spectrum | | | | | |
|---|---|---|---|---|---|---|
| | $d_1$ | $d_2$ | $d_3$ | ... | $d_n$ | |
| 0 | 54.702 | 56.458 | 54.296 | | 55.760 | |
| 0.2 | 54.540 | 58.098 | 54.630 | | 56.028 | |
| 0.4 | 56.166 | 57.472 | 54.355 | | 55.358 | |
| 0.6 | 57.069 | 56.801 | 56.710 | | 55.704 | |
| 0.8 | 58.114 | 57.197 | 56.745 | | 54.432 | |
| 1 | 57.812 | 55.474 | 55.251 | | 54.678 | |
| 1.2 | 59.971 | 54.011 | 56.770 | | 56.830 | |
| 1.4 | 60.765 | 53.229 | 56.120 | | 55.275 | |
| 1.6 | 62.467 | 51.821 | 54.874 | | 53.535 | |
| 1.8 | 60.259 | 50.889 | 55.057 | | 53.518 | |
| 2 | 58.850 | 49.864 | 54.099 | | 55.847 | |
| 2.2 | 58.367 | 52.350 | 53.977 | | 53.716 | |
| 2.4 | 60.138 | 54.468 | 52.729 | | 54.803 | |
| 2.6 | 60.681 | 55.009 | 50.460 | | 52.319 | |
| 2.8 | 59.431 | 54.052 | 52.201 | | 51.029 | |
| 3 | 60.408 | 55.613 | 53.587 | | 51.450 | |
| 3.2 | 58.611 | 56.882 | 55.865 | | 50.897 | |
| 3.4 | 60.686 | 59.168 | 55.692 | | 50.895 | |
| 3.6 | 60.840 | 60.685 | 57.771 | | 53.189 | |
| 3.8 | 62.181 | 60.798 | 55.731 | | 52.576 | |
| 4 | 62.867 | 63.150 | 56.100 | | 52.105 | |
| 4.2 | 63.602 | 64.500 | 55.680 | | 51.980 | |
| 4.4 | 64.584 | 66.370 | 56.875 | | 53.381 | |
| 4.6 | 65.521 | 66.456 | 55.503 | | 51.524 | |
| 4.8 | 64.902 | 65.371 | 55.792 | | 50.769 | |
| 5 | 62.647 | 66.783 | 57.372 | | 48.815 | |
| 5.2 | 61.475 | 64.316 | 58.876 | | 48.995 | |
| 5.4 | 59.823 | 61.907 | 59.042 | | 50.235 | |
| ... | | | | | | |
| $t_n$ | 59.199 | 64.119 | 60.520 | | 51.781 | |

| time (s) | raw signal $d_k$ | filtered | normalized | quality factor | qualified |
|---|---|---|---|---|---|
| 0 | 55.956 | 56.414 | 0.806 | 0.796 | 0.641 |
| 0.2 | 53.740 | 55.434 | 0.792 | 0.767 | 0.607 |
| 0.4 | 55.554 | 55.307 | 0.790 | 0.700 | 0.553 |
| 0.6 | 55.283 | 55.123 | 0.787 | 0.794 | 0.625 |
| 0.8 | 56.825 | 55.800 | 0.797 | 0.750 | 0.598 |
| 1 | 56.624 | 56.309 | 0.804 | 0.736 | 0.592 |
| 1.2 | 55.788 | 56.196 | 0.803 | 0.741 | 0.595 |
| 1.4 | 53.966 | 55.330 | 0.790 | 0.747 | 0.591 |
| 1.6 | 55.809 | 55.333 | 0.790 | 0.700 | 0.553 |
| 1.8 | 54.063 | 54.740 | 0.782 | 0.700 | 0.547 |
| 2 | 54.268 | 54.485 | 0.778 | 0.700 | 0.545 |
| 2.2 | 52.159 | 53.542 | 0.765 | 0.763 | 0.584 |
| 2.4 | 51.367 | 52.458 | 0.749 | 0.764 | 0.573 |
| 2.6 | 49.369 | 51.019 | 0.729 | 0.787 | 0.574 |
| 2.8 | 48.919 | 49.869 | 0.712 | 0.878 | 0.626 |
| 3 | 48.140 | 48.942 | 0.699 | 0.948 | 0.663 |
| 3.2 | 49.826 | 49.093 | 0.701 | 0.908 | 0.636 |
| 3.4 | 47.716 | 48.554 | 0.694 | 0.864 | 0.599 |
| 3.6 | 50.184 | 49.168 | 0.702 | 0.831 | 0.584 |
| 3.8 | 48.861 | 49.126 | 0.702 | 0.784 | 0.550 |
| 4 | 46.305 | 48.013 | 0.686 | 0.700 | 0.480 |
| 4.2 | 45.621 | 46.949 | 0.671 | 0.790 | 0.530 |
| 4.4 | 46.829 | 46.577 | 0.665 | 0.778 | 0.518 |
| 4.6 | 46.864 | 46.555 | 0.665 | 0.843 | 0.561 |
| 4.8 | 47.722 | 47.076 | 0.673 | 0.828 | 0.557 |
| 5 | 46.391 | 46.929 | 0.670 | 0.730 | 0.489 |
| 5.2 | 47.931 | 47.320 | 0.676 | 0.700 | 0.473 |
| 5.4 | 46.936 | 47.204 | 0.674 | 0.753 | 0.508 |
| 5.6 | 45.269 | 46.414 | 0.663 | 0.749 | 0.497 |
| 5.8 | 45.318 | 45.888 | 0.656 | 0.817 | 0.535 |
| ... | | | | | |
| $t_n$ | 45.499 | 44.197 | 2.776 | 3.299 | 0.000 | under review.

AUTONOMOUS CONFIDENCE CONTROL

CROSS-REFERENCE TO RELATED APPLICATIONS

This application is a continuation-in-part, and claims priority to and all advantages, of U.S. Ser. No. 15/053,028 filed on Feb. 25, 2016, titled "Autonomous Confidence Control", which application is hereby incorporated by reference in its entirety. This application is related to U.S. Ser. No. 15/053,012 filed on Feb. 25, 2016, titled "Autonomous Vehicle Control Transitioning"; U.S. Ser. No. 15/053,040 filed on Feb. 25, 2016, titled "Autonomous Occupant Attention-Based Control"; U.S. Ser. No. 15/053,052 filed on Feb. 25, 2016, titled "Autonomous Peril Control"; and U.S. Ser. No. 15/053,066 filed on Feb. 25, 2016, titled "Autonomous Probability Control", the contents of which are hereby incorporated by reference in their entirety.

This application is related to U.S. Ser. No. 15/073,093 filed on Mar. 17, 2016, titled "Autonomous Vehicle Control Transitioning"; U.S. Ser. No. 15/073,123 filed on Mar. 17, 2016, titled "Autonomous Occupant Attention-Based Control"; U.S. Ser. No. 15/073,129 filed on Mar. 17, 2016, titled "Autonomous Peril Control"; and U.S. Ser. No. 15/073,138 filed on Mar. 17, 2016, titled "Autonomous Probability Control", the contents of which are hereby incorporated by reference in their entirety.

BACKGROUND

Recent years have seen the development of so-called autonomous or semi-autonomous vehicles, i.e., passenger cars and the like that include computers programmed to carry our one or more vehicle operations. Such vehicles range from semi-autonomous vehicles having limited capabilities to control braking and steering (e.g., presently-existing lane-keeping technology) to fully autonomous vehicles such as are now known in which a vehicle computer may make all vehicle operation decisions, e.g., all decisions concerning propulsion, brakes, and steering.

A challenge arises in fully and semi-autonomous vehicles when a human operator requests control over one or more vehicle components. For example, in an autonomous vehicle, if an operator causes steering, brake or accelerator pedals to move, a vehicle computer may lack sufficient information to decide if it is better to hand control back to the driver or to continue autonomous control. In this example, the vehicle computer may lack information to determine that an operator has bumped a pedal or steering wheel when sleeping or inebriated, that a child or other passenger has bumped a steering wheel in the middle of a turn, etc.

On the other hand a computer controlling vehicle operations, e.g., in a fully autonomous vehicle, may have inadequate data for controlling and operating the vehicle. For example, conditions or malfunctions may prevent sensors from detecting a surrounding environment clearly, which may result in a vehicle computer providing instructions to steer a vehicle in dangerous direction.

In other instances, conditions may be in a "gray area" such that it is difficult to make a clear determination whether the vehicle computer and/or a human operator can safely operate some or all vehicle components. Thus, difficulties arise in a vehicle computer tasked with deciding how to share responsibility for operating a vehicle with a vehicle occupant. This problem is exacerbated by the fact that real world driving includes many different events with high variability, uncertainty, and vagueness.

DRAWINGS

DESCRIPTION

Introduction

Figure 1:
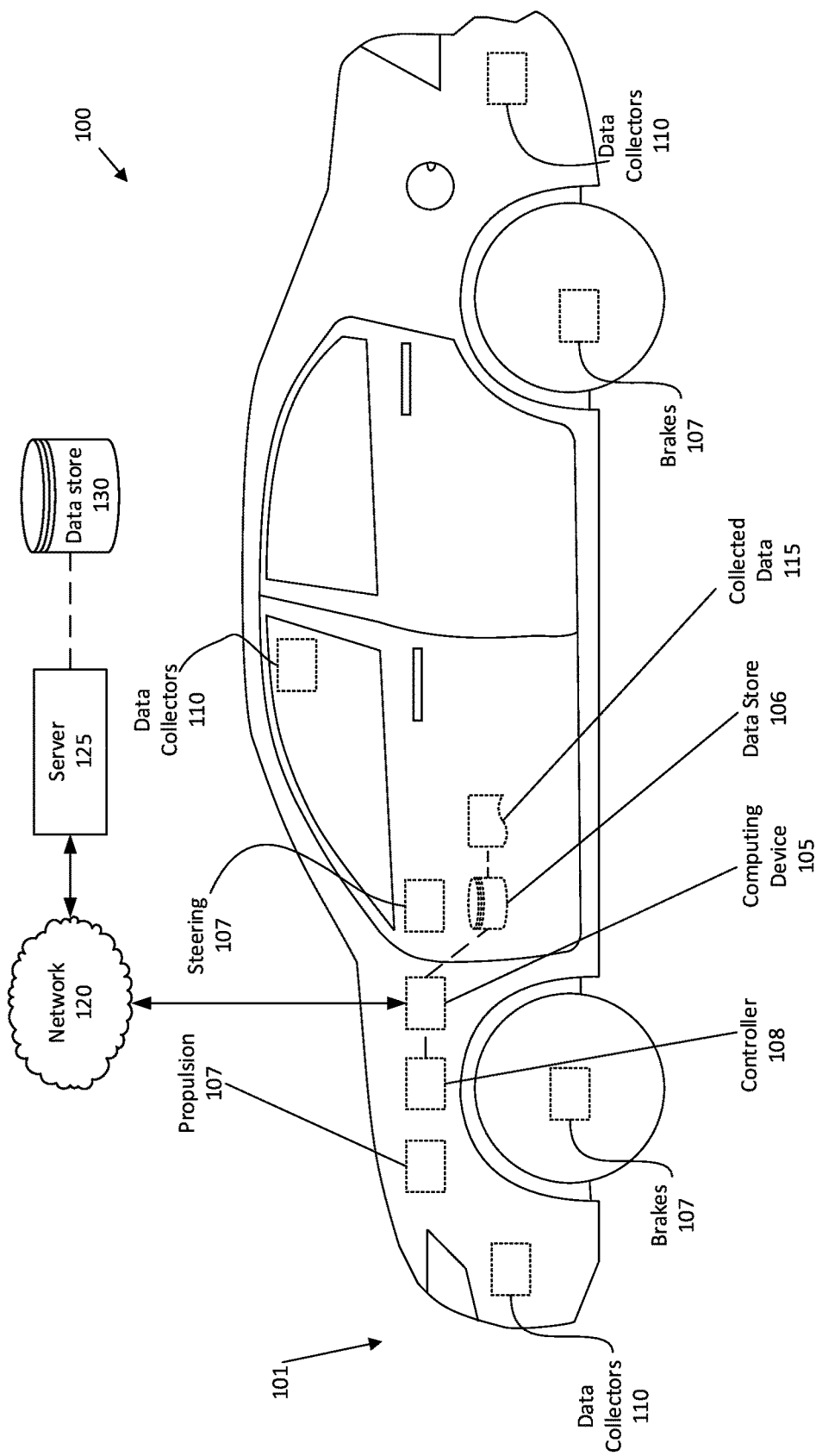
FIG. 1 is a block diagram of vehicle control system.

FIG. 1 is a block diagram of an exemplary autonomous vehicle system 100 that includes a vehicle 101 provided with one or more sensor data collectors 110 that gather collected data 115, e.g., relating to operation of the vehicle 101, an environment proximate to the vehicle 101, a vehicle 101 operator. A computing device 105 in the vehicle 101 generally receives the collected data 115, and further includes programming, e.g., as a set of instructions stored in a memory of, and executable by a processor of, the computing device 105, whereby some or all operations of the vehicle 101 may be conducted autonomously or semi-autonomously, i.e., without human control and/or with limited human intervention.

The computing device 105 is programmed to identify a permitted control state, i.e., manual control and/or computer control of one or more vehicle components. Further, the computer 105 may be programmed to identify one of a plurality of possible modes of vehicle operation. The computer 105 may obtain collected data 115 that may be used to evaluate a plurality of operational factors, each of the operational factor being a value that varies over time according to substantially current collected data 115. Operational factors are explained in detail below, and can include, for example, a driver alertness factor, a driver readiness factor, a driver action probability factor, an autonomous confidence factor, and/or a peril factor. The operational factors may be combined, e.g., subject to a fuzzy logic analysis that may weight the operational factors according to present conditions as well as operating history for the vehicle 101 and/or similar vehicles 101. Based on the operational factors, the computer 105 is programmed to output a vehicle 101 control decision, and to operate one or more vehicle 101 components according to the control decision.

For example, the vehicle 101 computer 105 may, based on the operational factors, output a control rule specifying a mode of vehicle 101 operation, e.g., autonomous, semi-autonomous, or manual, where autonomous mode means all operations related to vehicle propulsion, steering, and braking are controlled by the computer 105, semi-autonomous means a subset of the foregoing operations are controlled by computer 105, and some operations are left for operator control, and manual means that the foregoing operations are left for control by a vehicle occupant. Similarly, in another example, the computer 105 may determine a level of permissible human operator control, e.g., (1) no control of steering, brakes, or propulsion by the computer 101, (2) control of brakes by the computer 105, (3), control of brakes and propulsion by the computer 105, (4) control of brakes, propulsion, and steering by the computer 105, and (5) combine control, e.g.,) control of brakes, propulsion, and steering by the computer 105 but the occupant can apply a force to overcome a computer 105 actuated brake or accelerator pedal position and/or steering wheel position. Other examples of vehicle operations modes, e.g., different levels of autonomous operation, are discussed below.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions to select an autonomous operation mode, to adjust an autonomous operation mode, to change an autonomous operation mode, etc., of the vehicle 101. As further explained below, the computer 105 further generally includes instructions to determine a level of autonomous or semi-autonomous control, i.e., a set of components to be controlled according to programming in the computer 105 and/or a set of components to be controlled by a human operator, as well as instructions some or all vehicle 101 components if the vehicle 101 is in a full or semi-autonomous mode. For example, the computer 105 may include programming to operate one or more of vehicle brakes, propulsion (e.g., control of acceleration in the vehicle 101 by controlling one or more of an internal combustion engine, electric motor, transmission gear, spark advance, variable intake and exhaust cams, fuel ratio, etc.), steering, climate control, interior and/or exterior lights, etc., as well as to determine whether and when the computer 105, as opposed to a human operator, is to control such operations.

The computer 105 may include or be communicatively coupled to, e.g., via a vehicle 101 communications bus as described further below, more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a network in the vehicle 101 such as a controller area network (CAN) bus or the like. The computer 105 may also have a connection to an onboard diagnostics connector (OBD-II).

Via the CAN bus and/or other wired or wireless communications media (sometimes, as is known, generically referred to as the "vehicle bus" or "vehicle communications bus"), the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. Further, as mentioned below, various controllers and the like, e.g., an ECU, TCU, etc., may provide data 115 to the computer 105 via a vehicle 101 network, e.g., a CAN bus or the like.

In addition, the computer 105 may be configured for communicating with one or more remote computers 125 via the network 120, which, as described below, may include various wired and/or wireless networking technologies, e.g., cellular, Bluetooth, wired and/or wireless packet networks, etc. Further, the computer 105 generally includes instructions for receiving data, e.g., from one or more data collectors 110 and/or a human machine interface (HMI), such as an interactive voice response (IVR) system, a graphical user interface (GUI) including a touchscreen or the like, etc.

As already mentioned, generally included in instructions stored in and executed by the computer 105 is programming for operating one or more vehicle 101 components, e.g., braking, steering, propulsion, etc., without intervention of a human operator. Using data received in the computer 105, e.g., collected data 115 from data collectors 110, the server 125, etc., the computer 105 may make various determinations and/or control various vehicle 101 components and/or operations without a driver to operate the vehicle 101. For example, the computer 105 may include programming to regulate vehicle 101 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location, intersection (without signal) minimum time-to-arrival to cross the intersection, etc. Also, the computer 105 may make strategic determinations based on data 115, e.g., of a vehicle 101 route, waypoints on a route, etc.

The vehicle 101 includes a plurality of vehicle subsystems 107. The vehicle subsystems 107 control various components of the vehicle 101, e.g., a propulsion subsystem 107 propels the vehicle 101, a brake subsystem 107 stop the vehicle 101, a steering subsystem 107 turns the vehicle 101, etc. The subsystems 107 may each be actuated by, e.g., a specific controller 108 and/or directly by the computing device 105.

Controllers 108 are computing devices that are programmed to control a specific vehicle subsystem 107, e.g., a controller 108 may be an electronic control unit (ECU) such as is known, possibly including additional programming as described herein, e.g., an engine control unit, transmission control unit, a brake control module, etc. The controllers 108 are communicatively connected to and receive instructions from the computer 105 to actuate the subsystem according to the instructions. For example, a controller 108 may receive instructions from the computing device 105 to operate a vehicle subsystem 107, e.g., a propulsion, a brake, etc., with partial or no input from a human operator. The vehicle 101 may include a plurality of controllers 108.

Data collectors 110 may include a variety of devices known to provide data via a vehicle communications bus. For example, various controllers in a vehicle, as mentioned above, may operate as data collectors 110 to provide collected data 115 via the CAN bus, e.g., collected data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection.

Data collectors 110 can include sensors in or on the vehicle 101 to provide collected data 115 concerning a vehicle 101 occupant. For example, one or more camera data collectors 110 can be positioned to provide monitoring of eyes and/or a face of a vehicle 101 occupant in a driver's seat. Microphone data collectors 110 can be positioned to capture speech of a vehicle 101 occupant. Steering wheel sensor, acceleration pedal sensor, brake pedal sensor, and/or seat sensor data collectors 110 can be positioned in a known manner to provide information about whether an operator's hands and/or feet are in contact with and/or exerting pressure on various vehicle 101 components such as the foregoing. Further, the computer 105 may gather collected data 115 relating to an operator's use of a vehicle 101 human machine interface (HMI), e.g., a level of operator activity, e.g., a number of inputs per period of time, a type of operator activity, e.g., watching a movie, listening to a radio program, etc.

Data collectors 110 could also include sensors or the like, e.g., medium-range and long-range sensors, for detecting, and possibly also obtaining information from, objects proximate to a vehicle 101, such as other vehicles, roadway obstacles, etc., as well as other conditions outside the vehicle 101. For example, sensor data collectors 110 could include mechanisms such as radios, RADAR, lidar, sonar, cameras or other image capture devices, that could be deployed to detect surrounding features, e.g., roadway features, other vehicles, etc., and/or obtain other collected data 115 relevant to operation of the vehicle 101, e.g., measure a distance between the vehicle 101 and other vehicles or objects, to detect other vehicles or objects, and/or to detect road conditions, such as curves, potholes, dips, bumps, changes in grade, etc.

As yet a further example, GPS data 115 could be combined with 2D and/or 3D high resolution digital map data and/or basic data known as "Electronic Horizon data, such data, e.g., being stored in a memory of the computer 105. Based on data 115 relating to dead reckoning in a known manner, and/or some other simultaneous localization and mapping (SLAM) and/or localization computation such as is known, possibly using GPS data 115, digital map data 115 can be used as relevant data for the computer 105 to use when determining a vehicle 101 path or supporting a path planner, as well as other decision making processes for tactical driving decisions.

A memory of the computer 105 generally stores collected data 115. Collected data 115 may include a variety of data collected in a vehicle 101 from data collectors 110, and moreover, data 115 may additionally include data calculated therefrom in the computer 105. In general, collected data 115 may include any data that may be gathered by a collection device 110 and/or computed from such data, e.g., raw sensor 110 data 115 values, e.g., raw radar or lidar data 115 values, derived data values, e.g., a distance of an object 160 calculated from raw radar data 115, measured data values, e.g., provided by an engine controller or some other control and/or monitoring system in the vehicle 101. In general, various types of raw data 115 may be collected, e.g., image data 115, data 115 relating to reflected light or sound, data 115 indicating an amount of ambient light, a temperature, a speed, an acceleration, a yaw, etc.

Accordingly, in general, collected data 115 could include a variety of data 115 related to vehicle 101 operations and/or performance, as well as data related to in particular relating to motion of the vehicle 101. For example, in addition to data 115 obtained relating to other vehicles, roadway features, etc., collected data 115 could include data concerning a vehicle 101 speed, acceleration, braking, lane changes and or lane usage (e.g., on particular roads and/or types of roads such as interstate highways), average distances from other vehicles at respective speeds or ranges of speeds, and/or other data 115 relating to vehicle 101 operation.

In addition, collected data 115 could be provided from the remote server 125 and/or one or more other vehicles 101, e.g., using vehicle-to-vehicle communications. Various technologies, including hardware, communication protocols, etc., are known for vehicle-to-vehicle communications. For example, vehicle-to-vehicle messages could be sent and received according to Dedicated Short Range Communications (DSRC), or the like. As is known, DSRC are relatively low-power operating over a short to medium range in a spectrum specially allocated by the United States government in the 5.9 GHz band. In any case, information in a vehicle-to-vehicle message could include collected data 115 such as a position (e.g., according to geo-coordinates such as a latitude and longitude), speed, acceleration, deceleration, etc. of a transmitting vehicle 101. Further, a transmitting vehicle 101 could provide other data 115, such as a position, speed, etc. of one or more targets 160.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 received from one or more vehicles 101.

Additionally or alternatively, the server may provide data 115 for use by a vehicle computer 105. In general, a combination of data 115 from different sources, e.g., the data store 130 via the server 125, other vehicles 101, and/or data collectors 110 in a vehicle 101, may be synthesized and/or combined to provide the basis for an alert, message, and/or autonomous operation. For example, the vehicle 101 could receive, from a second vehicle and/or the server 125, information about an object in a roadway detected by the second vehicle.

Accordingly, the computer 105 could further be programmed to use its own history of operations and/or history recorded by other vehicles 101 for making determinations concerning autonomous operations.

The computing device 105 may use a fuzzy logic processor 22 to determine a control signal based on the operational factors. The operational factors typically start as crisp inputs 23, i.e., binary values of 0 or 1, but not between 0 and 1. The fuzzy processor 22 then applies a fuzzifier 24, i.e., a set of instructions that convert crisp inputs 23 into inputs that can have fuzzy logic applied to them, to create fuzzy inputs, i.e., values between 0 and 1. For example, the fuzzifier 24 may apply weights to convert binary operational factors to various real numbers between zero and one. The computing device 105 then uses an inference engine 25, i.e., a set of instructions to infer a control decision output based on the fuzzified factors, and a rule base 26, i.e., a set of rules that the inference engine 25 follow to infer the control decision output, to determine the control decision output. The fuzzy processor 22 then applies a defuzzifier 27, i.e., a set of instructions that convert the fuzzy control decision output, which is a value between 0 and 1, into a crisp output decision 28. The crisp output decision 28 may be one of four decisions: full human operator control, full virtual operator control, shared human and virtual operator control, and human control with virtual assist, as described above. The computing device 105 then saves the crisp output decision 28 in the data store 106 as historical data and actuates one or more vehicle 101 components based on the crisp output decision 28.

An example of fuzzified data is shown in Table 1 below. The first column from the left shows fuzzified inputs, i.e., data that are between 0 and 1. The second column in the middle shows the fuzzy weight applied to the fuzzified input. The fuzzy weights may be any value, including values exceeding 1. The last column on the right shows the fuzzified output, i.e., the input multiplied by the fuzzy weight. The outputs are then summed together to produce a fuzzified sum. The fuzzified sum is divided by the weighted sum, i.e., the sum of the fuzzy weights, to produce the resultant factor, which is between 0 and 1.

TABLE 1

| Fuzzified Inputs | Fuzzy Weight | Fuzzified Output |
|---|---|---|
| 0.870 | 2.410 | 2.097 |
| 0.093 | 0.107 | 0.010 |
| 0.953 | 7.417 | 7.069 |
| 0.347 | 1.036 | 0.360 |
| 0.892 | 4.009 | 3.576 |
| 0.269 | 0.225 | 0.061 |
| 0.862 | 6.050 | 5.241 |
| 0.368 | 0.715 | 0.263 |
| 0.321 | 0.533 | 0.171 |
| Weighted Sum | 22.503 | |
| Fuzzified Sum | 18.848 | |
| Factor | 0.838 | |

Operational Factors

As stated above, an operational factor is a numeric value based on weighted collected data 115 that relates to an ability of the computer 105 and/or to an ability of the human operator to control the vehicle 101. Each operational factor relates to a particular aspect of an ability of the computer 105 and/or a human operator to control the vehicle. Exemplary operational factors are discussed in the following paragraphs.

Alertness Factor (AL)

One example of an operational factor is an operator alertness factor. As mentioned above, various sensor data collectors 110 may gather data 115 about a vehicle 101 operator. This data 115 may be used to determine the operator alertness factor. For example, image recognition techniques such as are known could be used to determine, e.g., based on a person's eyes, facial expressions, etc., whether the person is awake, a sleep, sober, drunk, etc. Likewise, microphone data collectors 110 could provide data 115 that could be analyzed using known techniques to determine, based on a person's voice, whether the person was under the influence of drugs or alcohol. To take another example, steering wheel sensors 110 could be used to determine whether a person's hands were on or near a steering wheel, as could pedal and/or acceleration sensors 110. Collected data 115 from one or more of the foregoing, or from other data collectors 110, could be used to determine an operator alertness factor, e.g., a level of alertness normalized to a scale of between zero and one, where zero indicates the operator has zero alertness, e.g., is unconscious, and a one indicates that the operator is fully alert and able to assume control of the vehicle 101.

Readiness Factor (RE)

Another example of an operational factor is an operator readiness factor. Regardless of whether an operator is alert, the operator may not be ready to assume control of a vehicle 101 for various reasons, e.g., because the operator is watching a movie, and operator's seat is not properly positioned to assume control of the vehicle 101, etc. Accordingly, sensor data collectors 110 indicating at least one of a seat position, a brake response time, an accelerator response time, a steering response time, indicating a state of a vehicle 101 HMI, eye location and activity, voice focus, etc., could be used to provide data 115 to determine the operator readiness factor. For example, the seat position, e.g., the seat angle relative to a vehicle floor, may indicate whether the operator may be ready to assume control of the vehicle 101, e.g. a seat angle near perpendicular to the vehicle floor may indicate that the operator is ready to assume control. The seat angle may be compared to a predetermined seat angle threshold to indicate whether the operator is ready to assume control of the vehicle 101. The operator readiness factor could be normalized to a scale of from zero to one.

Probability Factor (PR)

Yet another example of an operational factor is an operator action probability factor. This operational factor indicates a probability, e.g., normalized from a scale of 0 to 1, that a driver action was performed with intent to control the vehicle 101. For example, if a vehicle is driving in a straight line along a straight road according to control by the computer 105, and a human operator attempts to turn the vehicle 101 steering wheel, the operator action probability factor may be relevant to determining whether the operator action was intentional. Accordingly, collected data 115 indicating upcoming road features, e.g., curves, obstacles, other vehicles, etc., could be used to determine the operator action probability factor. Further, an operator's history may be relevant to the operator action probability factor. For example, if an operator has a history of bumping a steering wheel, then the operator action probability factor could be reduced when a steering wheel is slightly moved. In any case, use of history data could be made in the context of a hidden Markov model or other probabilistic modeling, such as is known. The collected data 115 may determine the action probability factor PR. The computer 105 may evaluate data 115 about vehicle 101 operation, i.e., internal data, and data 115 from the surrounding environment, i.e., external data.

Autonomous Confidence Factor (AC)

Yet another example of an operational factor is an autonomous confidence factor. This factor, e.g., normalized from a scale of 0 to 1, provides an indication of confidence that the computer 105 is correctly assessing an environment around the vehicle 101. For example, the computer 105 may receive data 115 that includes images, radar, lidar, vehicle-to-vehicle communications, etc. indicating features of a roadway on which the vehicle 101 is traveling, potential obstacles, etc. The computer 105 may evaluate the quality of the data, e.g., image quality, clarity of objects detected, precision of data, accuracy of data, completeness of data, etc., as is known, to determine the autonomous confidence factor. The collected data 115 may be weighted to determine an autonomous confidence factor. The autonomous confidence factor is a measure of the confidence that a particular system is online and providing sufficient data to the computer 105 to support autonomous operation.

Peril Factor (PE)

Yet another example of an operational factor is a peril factor. The peril factor is a combination of the likelihood that an object will collide with the vehicle 101 and the severity of damage if the object will collide. For example, a high likelihood of colliding with a small object, e.g. a bush, may have a lower peril factor than a small likelihood of colliding with a large object, e.g. another vehicle 101. The peril factor is generally a predetermined value, e.g., on a normalized scale of zero to one, selected according to a determined risk of a scenario detected according to collected data 115. One or more peril factors associated with various scenarios may be stored, e.g., in a lookup table or the like, in the memory 106 of the computer 105. For example, collected data 115 could indicate an imminent frontal collision with another vehicle at a speed in excess of 50 kilometers per hour, whereupon a high peril factor, e.g., a peril factor of one, may be indicated. In another scenario, a pothole on a roadway ahead of a vehicle 101 could be detected when the vehicle 101 is traveling at a relatively low speed, e.g., 30 kilometers per hour, whereupon a peril factor that is relatively low, e.g., a peril factor of 0.25, could be indicated. A plastic bag or leaves blowing in front of a vehicle 101 at any speed could indicate a low peril factor, e.g., a peril factor of 0.10.

The computer 105 may determine a peril factor based on surrounding objects. The data 115 may include inputs from data collectors 110 indicating a number of objects in a predetermined distance range around the vehicle 101. The objects may include objects that the vehicle 101 has a risk entering a collision with, and the peril factor may measure the risk of collision with the object and the relative harm between collisions with different objects. The computer 105 may use fuzzy logic or the like to determine the peril factor, e.g., evaluating a type of object detected, a risk of injury or damage associate with the object, etc. The computer 105 may also determine a dynamics factor, as is known, the dynamics factor being the probability of the vehicle 101 colliding with the detected object. The dynamics factor may be determined in a known manner using the data 115.

Evaluation of Operational Factors

Collected data 115 may be weighted in different ways in determining operational factors, and then, as mentioned above, the operational factors may themselves be weighted when combined with other operational factors to make a vehicle 101 control determination. In general, the computing device 105 and controllers 108 may use any one of the operational factors individually or may combine two or more factors, e.g., the five factors disclosed herein, to determine autonomous control of the vehicle 101. For example, the computing device 105 may use only the autonomous confidence factor AC to determine whether the virtual operator is able to autonomously control the vehicle 101. The value of the autonomous confidence factor AC may result in a control determination for the vehicle 101 that selectively controls certain vehicle 101 subsystems autonomously.

Alertness Factor and Readiness Factor

An example of determining two operational factors, an alertness factor (AL) and a readiness factor (RE), is shown in Table 2 below.

TABLE 2

| Input | Source(s) | AL Weight | RE Weight |
|---|---|---|---|
| User face and eye image(s) | Image sensors, e.g., camera(s) | 0.43 | 0.23 |
| Use of vehicle controls (climate, audio, navigation, etc.) | Vehicle/computer inputs, e.g., buttons, knobs, touchscreen and/or other HMI elements | 0.07 | 0.05 |
| User speech | Microphones, speech recognition system (e.g., as part of an HMI) | 0.19 | 0.05 |
| Steering wheel contact and/or movement | Steering wheel sensors | 0.07 | 0.28 |
| Accelerator pedal movement | Powertrain control | 0.05 | 0.14 |
| Brake pedal movement | Brake control | 0.05 | 0.14 |
| User body movement | Occupant classification system, restraints control | 0.14 | 0.11 |

As seen in Table 2, a variety of inputs may be used to determine n different component operational factors AL and RE. For example, Table 2 shows seven inputs, i.e., in the present example, n=7, that could be used to determine component operational factors $AL_1$ through $AL_7$ and $RE_1$ through $RE_7$. The component operational factors could then be used to determine overall operational factors, which in turn, as explained further below, could be used by the computer 105 to make a control determination, e.g., whether to allow user control of the vehicle 101 and/or a level of user control to permit.

Accordingly, continuing the above example, each $AL_i$ and $RE_i$ could be determined by evaluating input data to arrive at a raw operational factor $AL_i$ or $RE_i$, e.g., a scaled value indicating user alertness or readiness based on the input data. For example, image data could be analyzed, e.g., a user's direction of gaze, whether eyes are open or closed, facial expressions, etc., to determine a user's level of alertness and/or readiness to operate the vehicle 101. Likewise, a number of times within a predetermined period of time, e.g., five minutes, 10 minutes, etc. that a user had accessed vehicle controls, such as climate control entertainment system, navigation system, and/or other inputs, could be used to determine a user's level of alertness and/or readiness to operate the vehicle 101. In general, individual or component raw operational factors $AL_{i(raw)}$ and $RE_{i(raw)}$ could be determined and normalized to a scale from 0 to 1. Raw factors $AL_{i(raw)}$ and $RE_{i(raw)}$ could be determined as binary values, e.g., zero indicating a user is not alert or not ready, and a one indicating that the user is alert or ready, and then be multiplied by appropriate weights to arrive at weighted component operational factors $AL_i$ and $RE_i$. Applying such weights may be a fuzzification step, i.e., a first step in a fuzzy logic analysis as discussed further below.

Further continuing the present example, operational factors $AL_1$ and $RE_1$ through $AL_n$ and $RE_n$ could be combined, e.g., summed or averaged, to arrive at overall factors $AL_{overall}$ and $RE_{overall}$. The overall factors could then be compared to predetermined thresholds to determine user alertness and/or readiness to assume vehicle 101 control. For example, $AL_{overall}$ could be compared to a first predetermined alertness threshold, and if it $AL_{overall}$ exceeds the first alertness threshold, the computer 105 could determine that the user has sufficient alertness to assume control of all vehicle 101 operations, e.g., braking, propulsion, and steering. A similar comparison to a first predetermined readiness threshold could be performed. Further, the computer 105 could be programmed to require both the first alertness threshold and the first readiness threshold to be met before it is determined to allow a user to assume full control of the vehicle 101.

Moreover, in addition to the first alertness and readiness thresholds, the computer 105 could be programmed to consider second, third, etc. alertness and/or readiness thresholds, and to allow varying levels of user control of the vehicle 101 based upon comparisons to these thresholds. For example, if $AL_{overall}$ and $RE_{overall}$ exceed second alertness and readiness thresholds, respectively, even if not meeting the first thresholds, the computer 105 could permit the user to assume control of certain vehicle 101 components, e.g., braking and acceleration, but not steering. At third alertness and readiness thresholds, even if the second thresholds are not met, the computer 105 could permit the user to assume control of a smaller set of vehicle 101 components, e.g., breaks only. If the third thresholds are not met, the user might be permitted no control, or could be permitted to provide inputs, e.g., to steering, braking, etc., to cooperate with decisions made by the computer 105. Such decision-making as described further below.

It is to be understood that the above example, although provided with respect to two operational factors, AL and RE, could be extended to include other operational factors, such as the operator action probability factor, the autonomous confidence factor, and the peril factor, discussed above.

Figure 3:
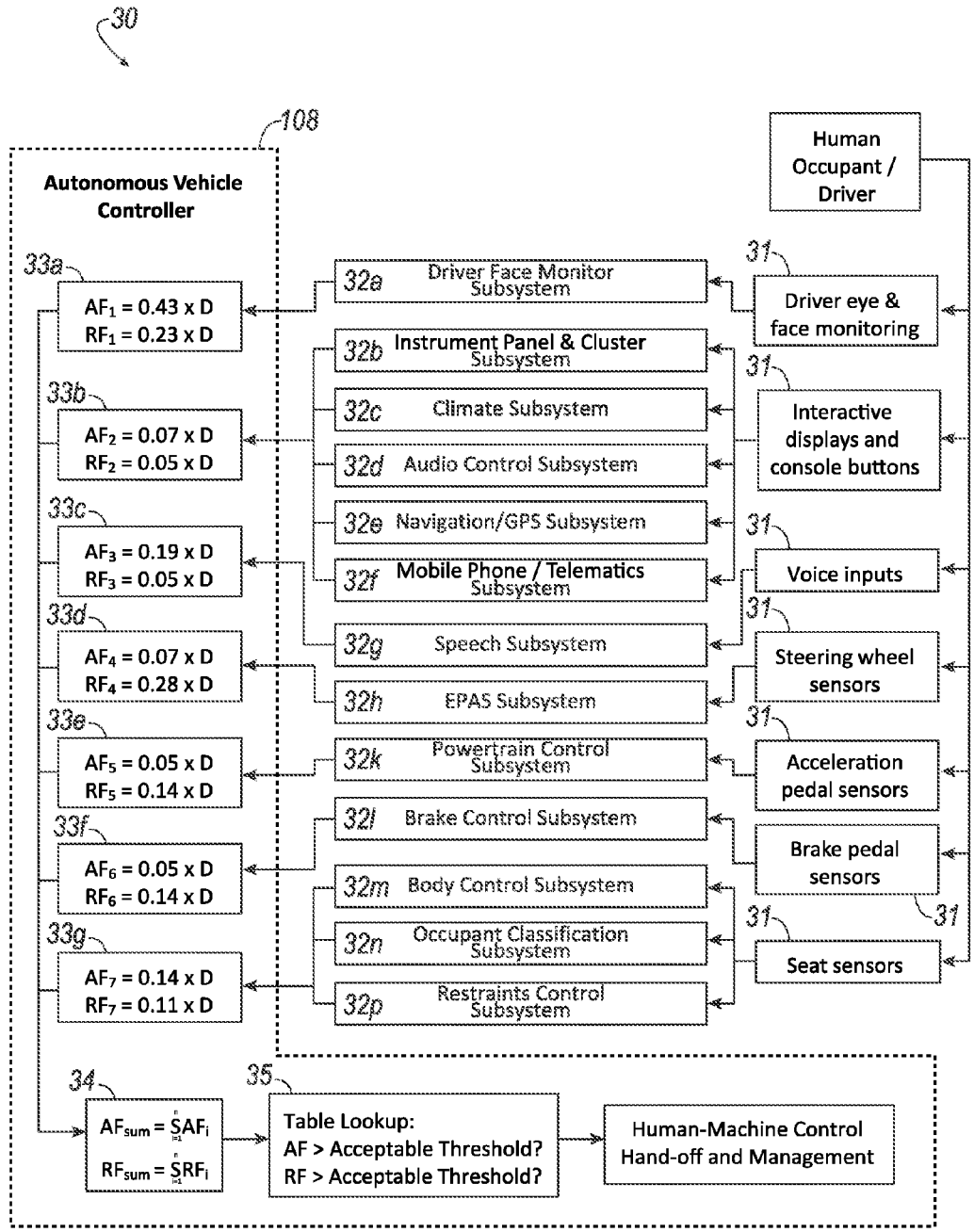
FIG. 3 is a diagram of another processing subsystem that could be implemented in the context of the system of FIG. 1 to determine an alertness factor and a readiness factor.

FIG. 3 illustrates an example subsystem 30 for determining the alertness and readiness factors. The computing device 105 collects input operator data from a plurality of sources, e.g., driver eye and face monitoring subsystems, interactive displays and console buttons, voice inputs, steering wheel sensors, acceleration pedal sensors, brake pedal sensors, and seat sensors. The sources may include a plurality of subsystems, e.g., such as are known, e.g., the interactive displays and console buttons may provide data from a climate control subsystem, an audio control subsystem, a navigation subsystem, and a telematics subsystem. The several inputs are then used to determine component operational factors $AL_i$ and $RE_i$, e.g., the seven component factors described above in Table 2.

The component operational factors then can be summed into the alertness factor AL and the readiness factor RE. The computing device 105 then can compare the factors AL, RE to predetermined thresholds, as described above, and adjusts operation of vehicles subsystems based on whether the factors AL, RE exceed the thresholds.

The subsystem 30 includes a plurality of inputs 31, typically coming from a human operator. The inputs 31 include, e.g., operator eye and face monitoring, interactive displays, console buttons, voice inputs, steering wheel sensors, acceleration pedal sensors, brake pedal sensors, and seat sensors. The inputs 31 produce data 115.

The data 115 can then be provided to a plurality of subsystems, including, e.g., a driver face monitor subsystem 32a, an instrument panel and cluster subsystem 32b, a climate subsystem 32c, an audio control subsystem 32d, a navigation/global position subsystem 32e, a telematics subsystem 32f, a speech subsystem 32g, an EPAS subsystem 32h, a powertrain control subsystem 32k, a brake control subsystem 32l, a body control subsystem 32m, an occupant classification subsystem 32n, and a restraint control subsystem 32p.

The subsystems 32a-32p use the data 115 to produce individual readiness factors $RE_i$ and alertness factors $AL_i$, as described above. The individualized factors are then multiplied by a weighting factor to produce factors 33a-33g. For example, the driver face monitor subsystem 32a uses data 115 to determine alertness and readiness factors 33a, the subsystems 32b-32f use data 115 to determine alertness factors and readiness factors 33b, the subsystem 32g determines the factors 33c, the EPAS subsystem 32h determines the factors 33d, the powertrain control subsystem 32k determines the factors 33e, the brake control subsystem 32l determines the factors 33f, and the subsystems 32m-32p determine the factors 33g.

The factors 33a-33g then can be summed into global alertness and readiness factors 34. The global alertness and readiness factors 34 are then compared to respective alertness and readiness thresholds 35. Depending on whether none, one, or both of the alertness and readiness factors exceed the respective thresholds 35, the computing device 105 then instructs controllers 108 for vehicle 101 subsystems to operate with varying levels of autonomous control or manual control, i.e., full autonomous control with each of propulsion, steering, and braking controlled by the computer 105, or semi-autonomous control with less than all of such vehicle systems controlled by the computer 105, or full manual control. For example, if the alertness factor AL exceeds the threshold, the computing device 105 may allow full operator control of the vehicle 101 subsystems.

Action Probability Factor

To determine the action probability factor PR, the computer 105 can determine probability arrays based on the internal and external data, e.g., a probability array describing the probability of the vehicle 101 location and speed, and a probability array describing the potential danger of being in a location at a given speed. A probability array is a set of probabilities that the vehicle 101 will alter one of its position, direction, speed, or acceleration by a certain amount, e.g., altering its direction by an angle θ, based on the current vehicle 101 state, i.e., current speed, current steering angle, current acceleration, etc. The probabilities for a number of changes, e.g., for a plurality of angles θ, are then collected into a single array; this array is the "probability array." The probability array may be represented as a set of vectors, as shown in FIGS. 7-8, where the length of the vector indicates the magnitude of the peril factor and the direction of the vector indicates the change in trajectory.

A directional probability array represents the probability that the vehicle 101 will alter the directional component of its trajectory in the future based on multiple inputs, e.g., speed, acceleration, road conditions, steering angle, stability limits, nearby vehicles and/or objects, etc. In one example, a directional probability array based on a vehicle trajectory may chart the probability distribution of a future trajectory of a vehicle 101 relative to the current trajectory. Examples of the directional probability array $P_{d,k,\theta}$ for an index k (representing a time $t_k$) where the trajectory moves an angle θ, measured here in degrees, relative to the current trajectory. The current trajectory is defined where θ=0 and positive θ is counterclockwise relative to the trajectory, are shown in Table 3 below:

TABLE 3

| θ | $P_{d,k,\theta}$ | θ | $P_{d,k,\theta}$ |
|---|---|---|---|
| −60 | 0.000000 | 60 | 0.000000 |
| −4 | 0.082165 | 4 | 0.082944 |
| −3 | 0.102110 | 3 | 0.103680 |
| −2 | 0.109380 | 2 | 0.109150 |
| −1 | 0.115310 | 1 | 0.113060 |
| 0 | 0.118580 | | |

For example, the probability that the trajectory will change by −3 degrees is 0.102110, or about 10%. The probabilities may change based on internal and external data, e.g., if another vehicle 101 is detected in an adjacent left lane, the probabilities for the negative angle trajectories may be lower than those for the positive angle trajectories. In another example, if the computer 105 detects an object straight ahead of the vehicle 101, the probabilities for small angle changes in the trajectory may be lower than the probabilities for large angle changes in the trajectory.

Figure 10:
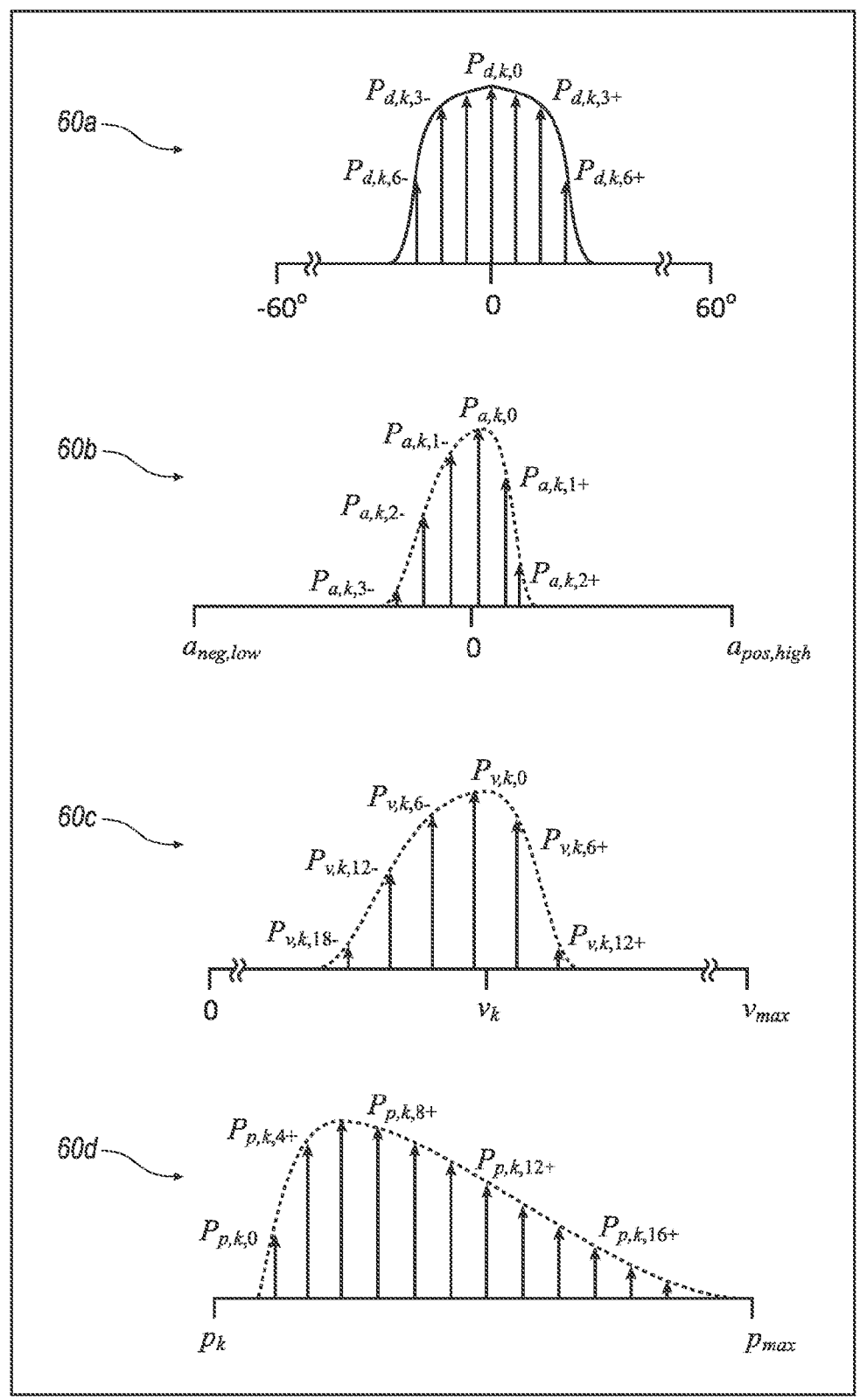
FIG. 10 is a diagram of example probability arrays that could be used to determine an action probability factor.

FIG. 10 illustrates a plurality of exemplary probability arrays that can be used to determine the action probability factor AF. The first probability array 60a is an example of a directional probability array, as described above, and plots a likelihood that the vehicle 101 will alter its direction by an angle θ from its current direction. The second probability array 60b is an example of an acceleration probability array. Here, the array plots the likelihood that the vehicle 101 will change its acceleration from its current acceleration. The probability $P_{a,k,0}$, in the center of the array, indicates the probability that the acceleration will not change, with negative changes to acceleration plotted to the left of the center, and positive changes to acceleration plotted to the right of the center.

The third probability array 60c is an example of a velocity probability array, plotting a probability that the vehicle 101 will increase or decrease its velocity. Here, the center probability $P_{v,k,0}$ indicates the probability that the vehicle 101 will not change its velocity, with negative changes to velocity plotted left of center and positive changes to velocity plotted right of center.

The fourth probability array 60d is an example of a position probability array, plotting the probability that the vehicle 101 will change its position. Here, the probability that the vehicle will not change its position at all, $P_{p,k,0}$, is on the far left, with increasing changes in position plotted to the right. That is, continuing to the right on the plot indicates the probability of a larger change in vehicle 101 position.

Figure 11:
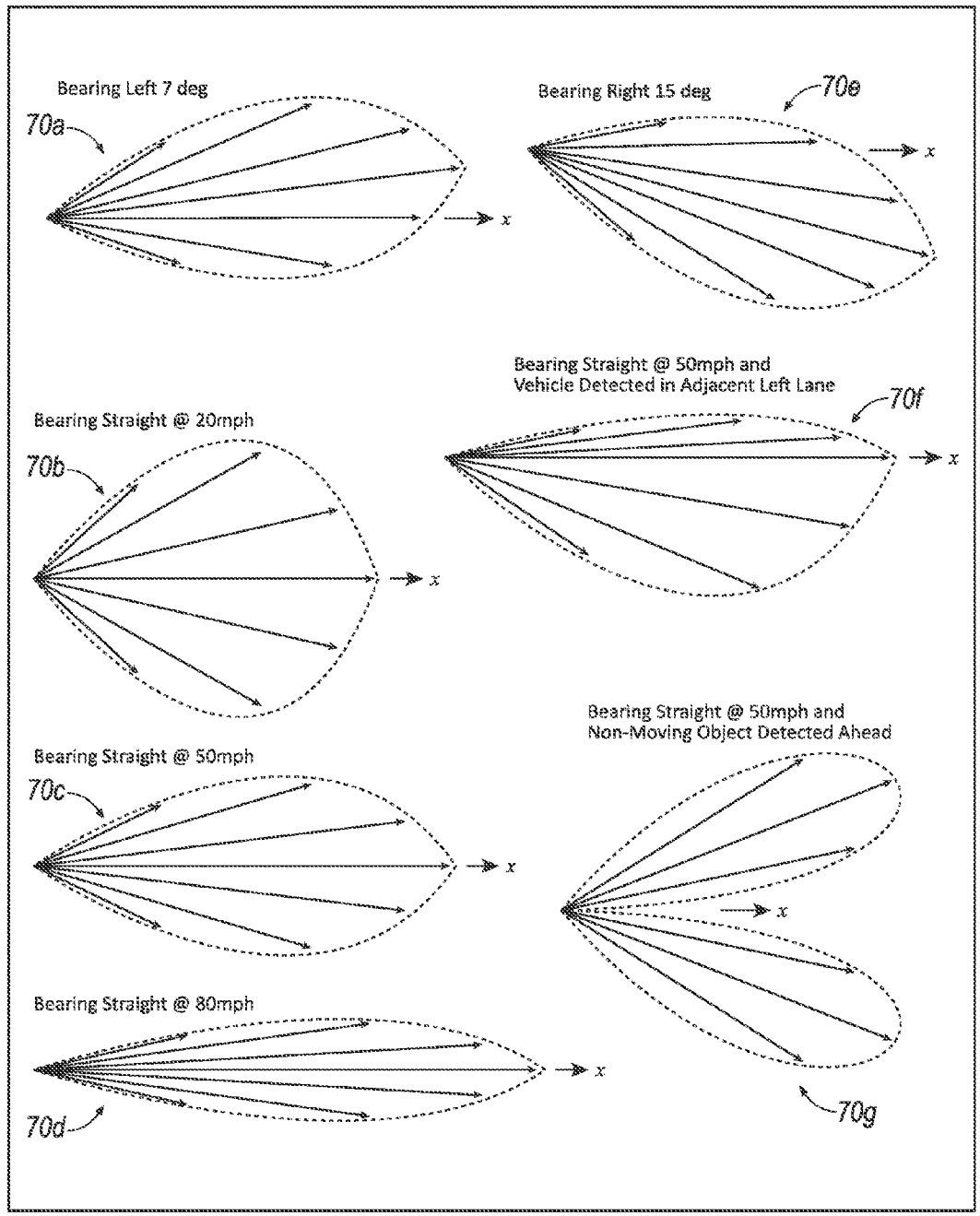
FIG. 11 illustrates a plurality of directional probability arrays that each indicate a potential vehicle trajectory.

FIG. 11 illustrates more example directional probability arrays for various vehicle 101 states. For example, the probability array 70a illustrates a probability array for a vehicle 101 bearing to the left 7 degrees. In another example, the probability array 70e illustrates a vehicle 101 bearing to the right 15 degrees. When a vehicle 101 bears in a direction away from straight, the probability arrays typically shift to increase probabilities of directional change toward that direction. That is, a vehicle 101 bearing to the right may have a higher probability of changing its direction to the right. Similarly, the probability array 70b, which is an example of the vehicle 101 bearing straight, may have probabilities equally spaced around the center.

The exemplary probability arrays 70b, 70c, and 70d illustrate probability arrays for a vehicle bearing straight at increasing speeds, here, 20 miles per hour (mph), 50 mph, and 80 mph, respectively. As speed increases, the probability arrays typically narrow, i.e., the probability that the vehicle 101 will remain straight or change by small amounts is greater than the probability that the vehicle 101 will change its direction by a large amount. Because changing vehicle 101 direction requires a change in the vehicle 101 forward momentum, vehicles 101 at higher speeds that have higher forward momentum may be less likely to make large changes to their direction.

The probability arrays 70f and 70g are examples of probability arrays generated where an object may alter the probability that the vehicle 101 will change direction. The exemplary probability array 70f illustrates a set of probabilities that a vehicle 101 will change its direction when an object, e.g., another vehicle 101, is in the adjacent left lane. Here, because an object is directly to the left of the vehicle 101, the probability that the vehicle 101 will change its direction to the left (and possibly collide with the object) may be less than the probability that the vehicle 101 will remain straight or change its direction to the right. Similarly, the probability array 70g is an example of a probability array when there is a non-moving object directly ahead of the vehicle 101. Here, the vehicle 101 will collide with the object if the vehicle 101 does not change its direction, so the probability that the vehicle 101 will not change its direction is 0, as shown by the lack of an arrow pointing in the center of the array. Because the object is directly in front of the vehicle 101, the probabilities that the vehicle 101 will change its direction to either the left or the right are substantially the same, with a large change in direction more likely than a small change, as shown by the longer arrows farther from the center.

Figure 12:
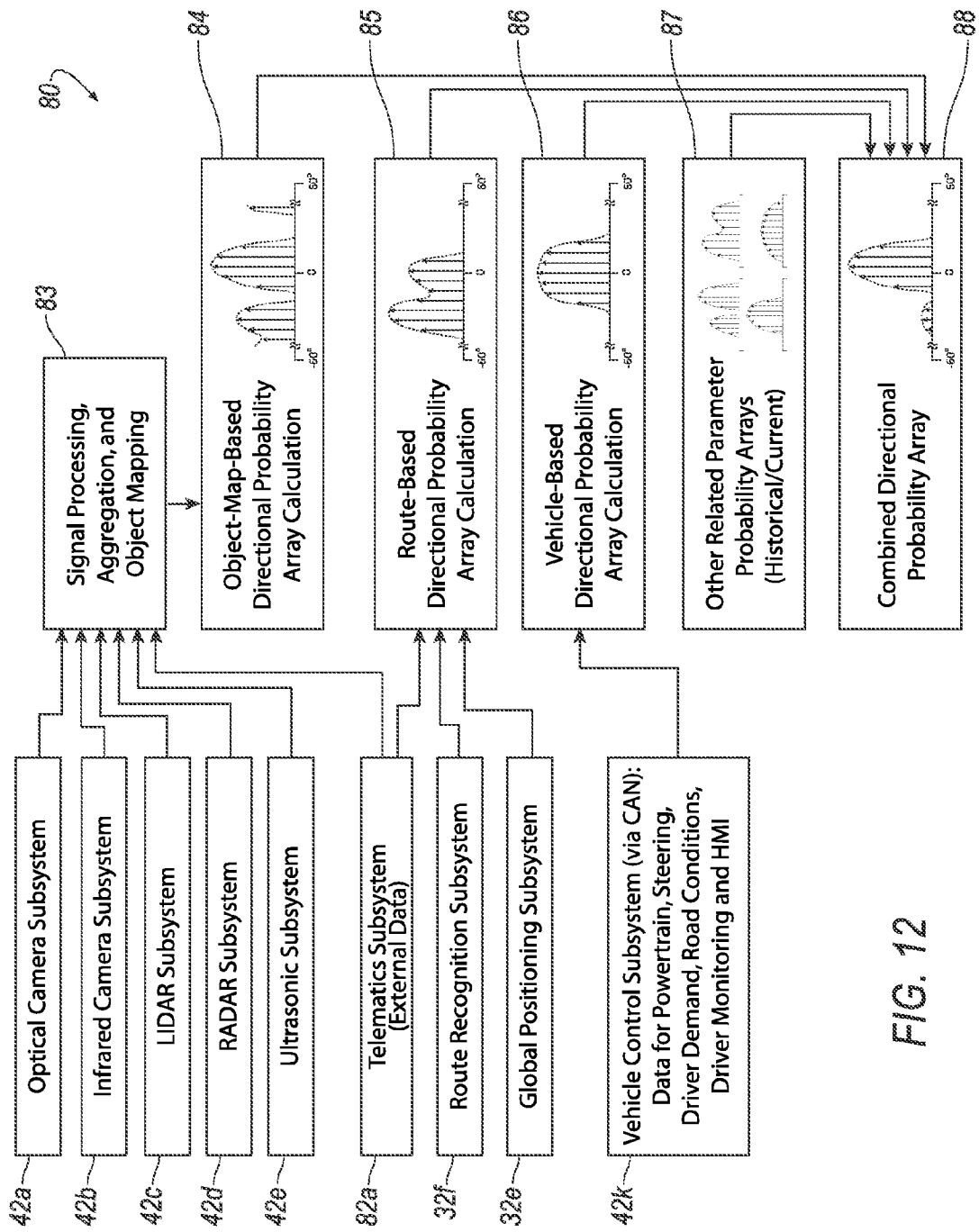
FIG. 12 is a diagram of another processing subsystem that could be implemented in the context of the system of FIG. 1 to determine a combined directional probability array.

FIG. 12 illustrates a subsystem 80 for determining a plurality of directional probability arrays calculated from a plurality of data sources. In addition to the vehicle-based directional probability array described above, the computer 105 may calculate several other probability arrays based on certain data 115. One such probability array is an object-based probability array 84, which uses data 115 about objects surrounding the vehicle 101 collected with, e.g., cameras, lidar, radar, etc., to determine a probability array for a change in the vehicle 101 direction based on surrounding objects. The data 115 are collected with various vehicle 101 subsystems, e.g., the optical camera subsystem 42a, the infrared camera subsystem 42b, the lidar subsystem 42c, the radar subsystem 42d, the ultrasonic subsystem 42e, a telematics subsystem 32f, a route recognition subsystem 82b, a global position subsystem 32e, and vehicle 101 control subsystems 42k. The data 115 from the subsystems 42a-42e, 32f are sent to a signal processing subsystem 23 to process the data 115 and develop the object map-based directional probability array calculation 84. For example, if there is another vehicle 101 in the adjacent left lane, the probability of moving to the left is much lower than moving to the right.

Another directional probability array may be a route-based directional probability array 85. The route-based directional probability array uses data 115 from, e.g., a telematics subsystem 32*f*, a navigation system, a route recognition subsystem 82*a*, a global position system 32*e*, etc., to determine the likelihood of changing vehicle 101 direction based on the intended vehicle 101 route. For example, if the route includes a left turn or there is an upcoming curve in the road, the route-based directional probability array may show an increased probability to change the vehicle 101 direction in the direction of the turn or impending curve.

Another directional probability array may be a vehicle-based directional probability array 86, which uses data from vehicle control subsystems 42*k* to determine a directional probability array 86 for the vehicle 101. Yet another directional probability array may be historical directional probability arrays 87 stored in, e.g., the data store 106 and/or the server 125. The historical directional probability arrays may be previously calculated directional probability arrays saved by the computer 105. The computing device 105 may combine the directional probability arrays 84-87 into a combined directional probability array 88.

Figure 13:
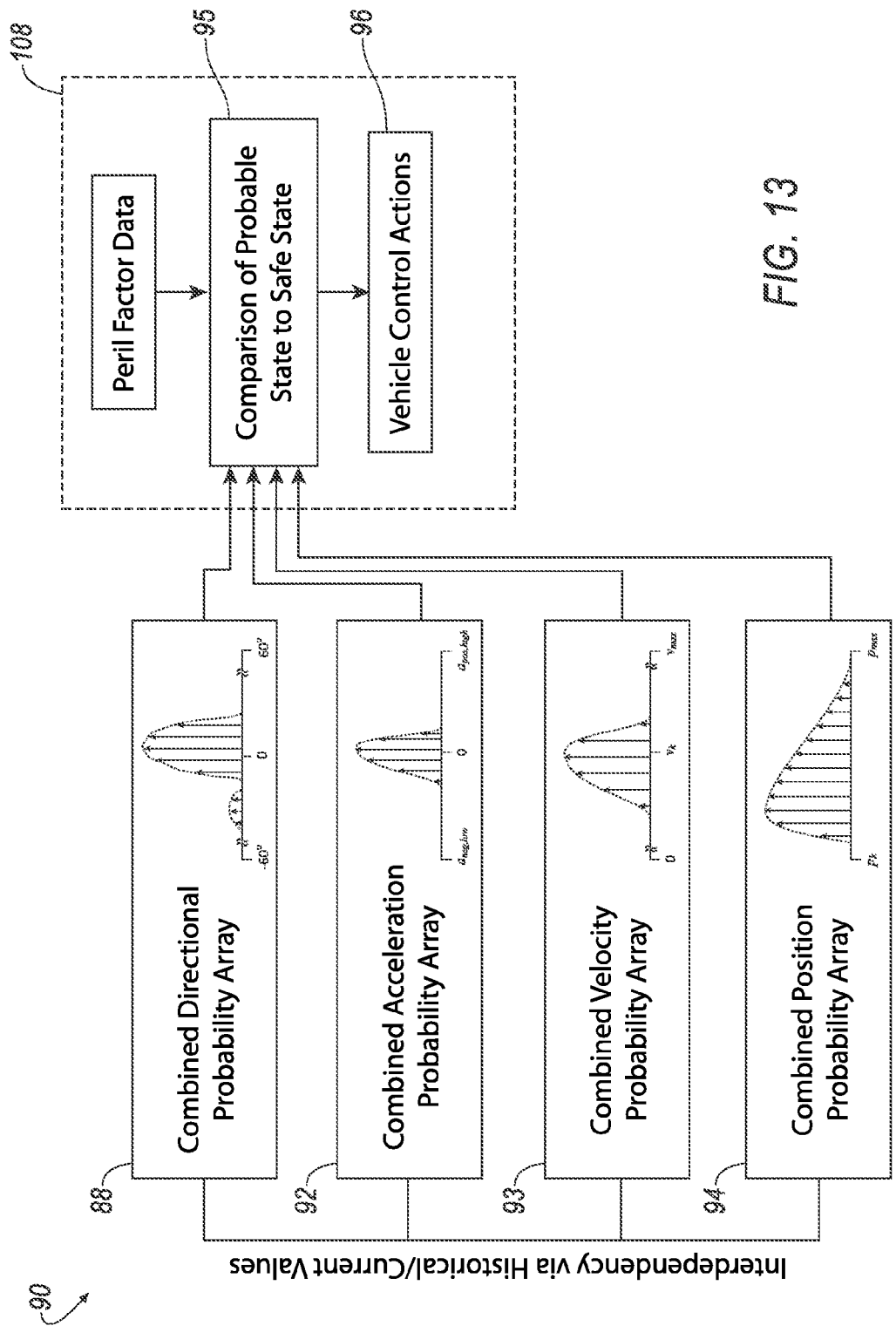
FIG. 13 is a diagram of another processing subsystem that could be implemented in the context of the system of FIG. 1 to determine the action probability factor.

FIG. 13 illustrates a subsystem 90 for collecting a plurality of probability arrays to control vehicle 101 subsystems. The directional probability array 88 may be collected with an acceleration probability array 92, a velocity probability array 93, and a position probability array 94 and sent to the controller 108. According to programming executed in a controller 108, the probability arrays 88, 92, 93, 94 may then be compared to a predetermined safe state array 95, i.e., deviations from the safe state array 95 may indicate that the intended operation may be unsafe. The predetermined safe state array 95 includes probability arrays for direction, acceleration, velocity, and position that are determined by, e.g., a virtual operator, to predict safe operation of the vehicle 101. The difference between the probability arrays 88, 92, 93, 94 and the predetermined safe state array 95 may be used to calculate the action probability factor PR. The controller 108 may include data 115 related to peril factor PE to determine the probability factor PR and to determine the level of autonomous control for vehicle 101 subsystems, i.e., vehicle control actions 96.

Autonomous Confidence Factor

To determine the autonomous confidence factor AC, a specific component autonomous factor $AC_i$ may be determined for each of a plurality of subsystems, including (1) an optical camera, (2) an infrared camera, (3) a lidar, (4) a radar, (5) an ultrasonic sensor, (6) an altimeter, (7) a telematics system, (8) a global position system, and (9) vehicle 101 components. Here, the index i refers to the reference number corresponding to one of the 9 subsystems in the present example, and in general may represent an entry in a list of any number of subsystems. The specific component autonomous factors for each of the subsystems may have a corresponding predetermined weighting factor $D_i$, as described above for the alertness and readiness factors. The weighting factors may differ for differing subsystems, e.g., a lidar may have a higher weighting factor than an optical camera because the lidar may be more robust and/or of higher precision and accuracy. The component autonomous factors for the subsystems may be combined with the weighting factors to determine a global autonomous confidence factor:

$$AC = \sum_{i=1}^{9} AC_i \cdot D_i$$

The global autonomous confidence factor AC may then be compared to predetermined thresholds to allow one of full operator control, full autonomous control, or partial autonomous control. For example, when the global autonomous confidence factor is below a first threshold, the computer 105 may allow autonomous control of certain subsystems, i.e., the vehicle 101 may operate in partial autonomous control. The subsystems that the computer 105 may allow for autonomous control may be the subsystems with the highest confidence factors. In another example, when the global autonomous confidence factor is below a second threshold, the second threshold being lower than the first threshold, the computer 105 may allow full operator control and stop autonomous control of the vehicle 101. The computer 105 may be programmed with a plurality of thresholds indicating the confidence factor required to operate each specific system autonomously.

Figure 4:
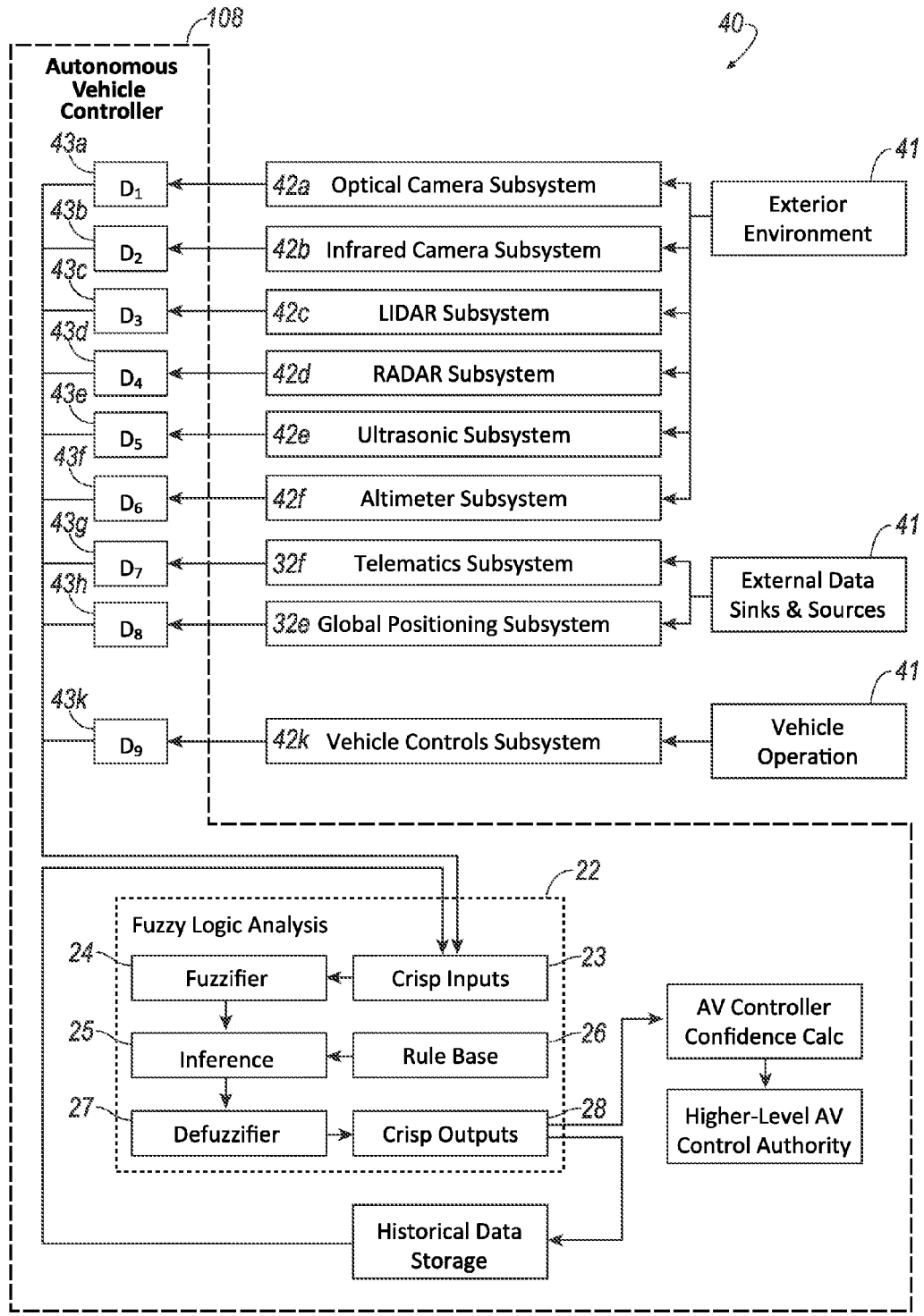
FIG. 4 is a diagram of another processing subsystem that could be implemented in the context of the system of FIG. 1 to determine an autonomous confidence factor.

FIG. 4 illustrates an exemplary subsystem 40 for determining the autonomous confidence factor AC. The subsystem includes a plurality of component subsystems 42*a*-42*k* that each collect data from a plurality of sources 41, e.g., an exterior environment, external data stores, and signals from vehicle components. Each of the component subsystems 42*a*-42*k* then can determine a component autonomous factor $AC_i$, which is sent to a controller 108, which applies a specific component weighting factor $D_i$ that is multiplied to the component autonomous factor $AC_i$. The specific value of the weighting factor $D_i$ may vary depending on the value of the component autonomous factor $AC_i$. For example, as shown in Table 4 below, the computer 105 may include a look-up table for the weighting factor $D_i$. The collected data 115 are normalized according to expected and/or historical values of the data, as is known. The computer 105 then determines the weighting factor $D_i$ based on, e.g., a look-up table. The normalized data is then multiplied to the weighting factor $D_i$ to get component confidence factors 43*a*-43*k* for each respective component subsystem 42*a*-42*k*. The component confidence factors 43*a*-43*k* are then used by the computing device 105 as crisp inputs 23 in a fuzzy logic processor 22.

TABLE 4

| Time (s) | Normalized Data | Weighting Factor | Component Factor |
|---|---|---|---|
| 0 | 0.806 | 0.796 | 0.641 |
| 1 | 0.804 | 0.736 | 0.592 |
| 2 | 0.778 | 0.700 | 0.547 |
| 3 | 0.699 | 0.948 | 0.663 |
| 4 | 0.686 | 0.700 | 0.480 |

The computer 105 may be programmed to determine the autonomous confidence factor AC with fuzzy logic, as is known. Specifically, rather than relying solely on the sum of the confidence factors from the subsystems, as described above, the computer 105 may fuzzify the data 115 in a fuzzifier 24, e.g., weights could be applied as described above to convert the data 115 to various real numbers between zero and one, that determine the subsystem confidence factors. Based on the fuzzified data, the computer 105 may apply a set of predetermined rules, e.g., an inference engine 25 could use a rule base 26 to evaluate the fuzzified data, as shown in FIG. 4. When the data 115 are defuzzified in a defuzzifier 27 after applying the rules 26, the computer 105 may use the crisp outputs 28 to determine a global autonomous confidence factor AC. Based at least in part on the global autonomous confidence factor AC, the computing device 105 may instruct the controller 108 to actuate at least one of a plurality of vehicle subsystems in an autonomous mode or in a manual mode.

Figure 5A:
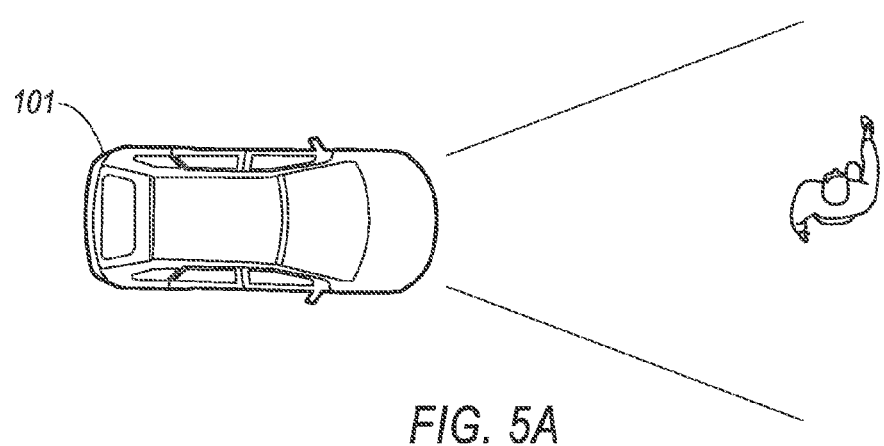
FIGS. 5A-5C illustrate an example set of data collectors collecting data and determining confidence of the data.
Figure 5B:
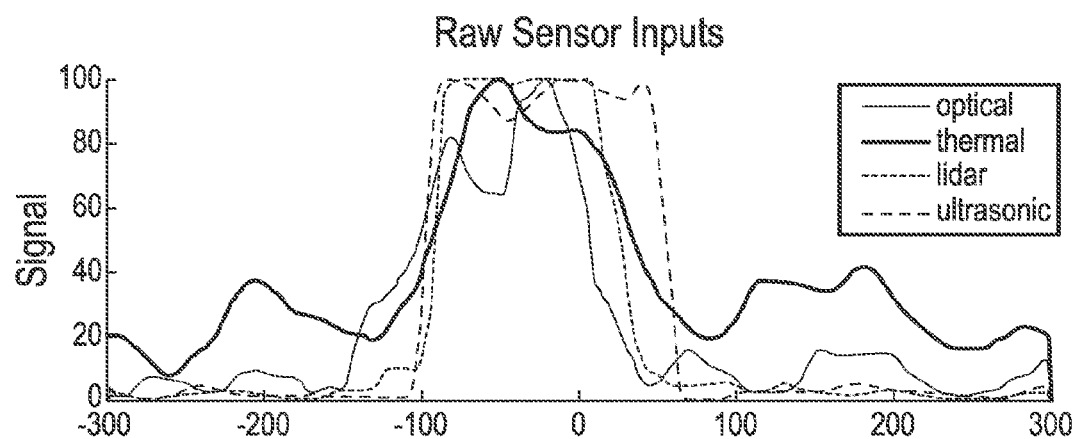

FIG. 5A illustrates an example vehicle 101 detecting an object, here, a pedestrian. The vehicle 101 uses data collectors 110 to determine the object in front of the vehicle 101. Here, the object is clearly identified as a pedestrian because, as explained below, the signal confidence is high. FIG. 5B illustrates raw sensor inputs from data collectors 110, e.g., an optical camera system 42a, a thermal sensor, a lidar system 42c, and an ultrasonic system 42e. The vertical axis is a confidence value for the signal, ranging from 0 to 100, and the horizontal axis indicates an angle relative to the direction of motion of the vehicle 101 along which the data collector 110 collects data 115. For example, the raw sensor input values for the ultrasonic system 42e are nearly 100 from angles of −100 to 100, indicating high confidence of the quality of the signals from the ultrasonic system 42e.

Figure 5C:
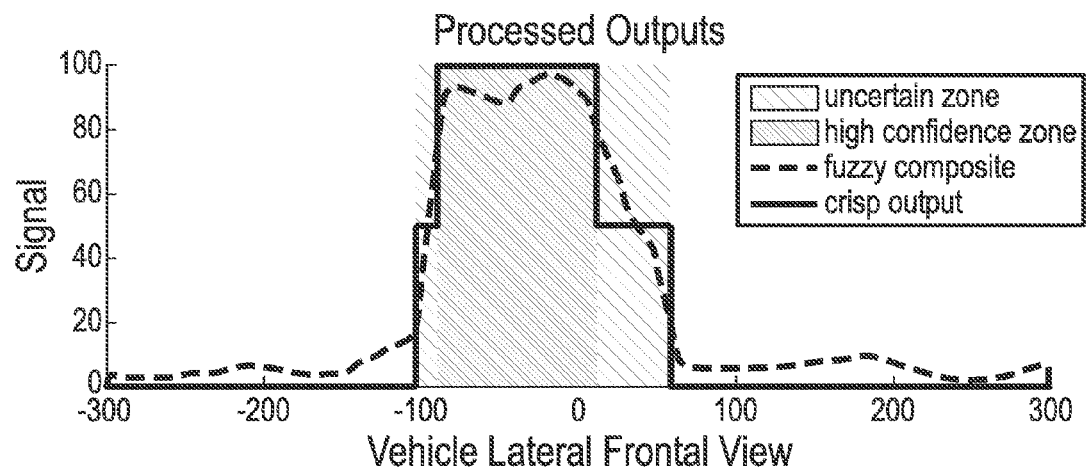

FIG. 5C illustrates the signals of FIG. 5B processed and converted into confidence zones, a fuzzy composite, and a crisp output. The signals of FIG. 5B are processed, as explained below in FIGS. 7A-7B, and a confidence value is assigned to the processed signals, producing the fuzzy composite signal curve, shown in dashed lines in FIG. 5C. As shown in FIG. 5C, when the fuzzy composite is below a first threshold value, the crisp output is 0, defining a zone with no confidence. When the fuzzy composite is above the first threshold value and below a second threshold value, the crisp output is, in this example, 50, and defines an uncertain zone. When the fuzzy composite is above the second threshold, the crisp output is 100, defining a high confidence zone. FIG. 5C illustrates signals having a large high confidence zone, so the computer 105 may rely on the data 115 collected by the data collectors 110 and identify an approaching object. The autonomous confidence factor AC for the example of FIGS. 5A-5C may be high as a result.

Figure 6A:
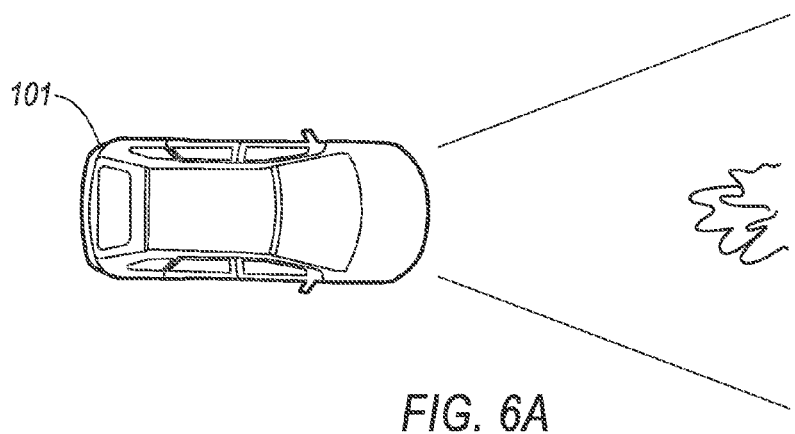
FIGS. 6A-6C illustrate another example set of data collectors collecting data and determining confidence of the data.
Figure 6B:
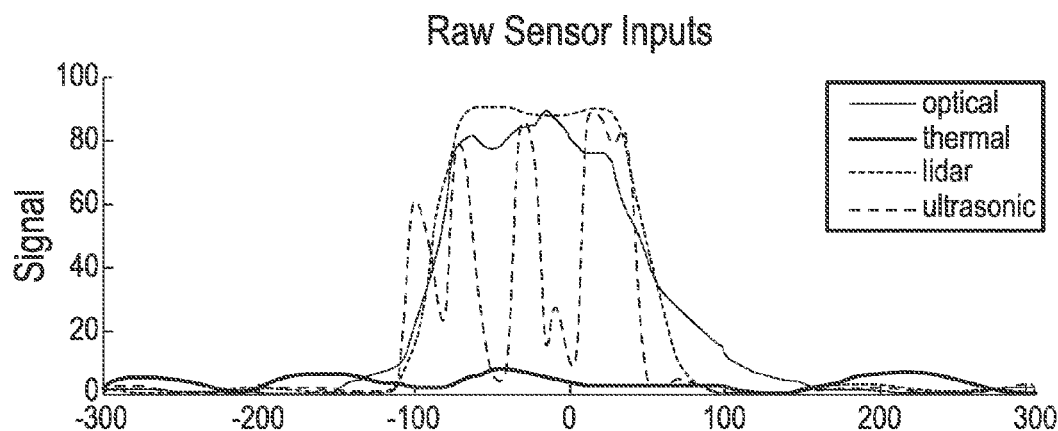
Figure 6C:
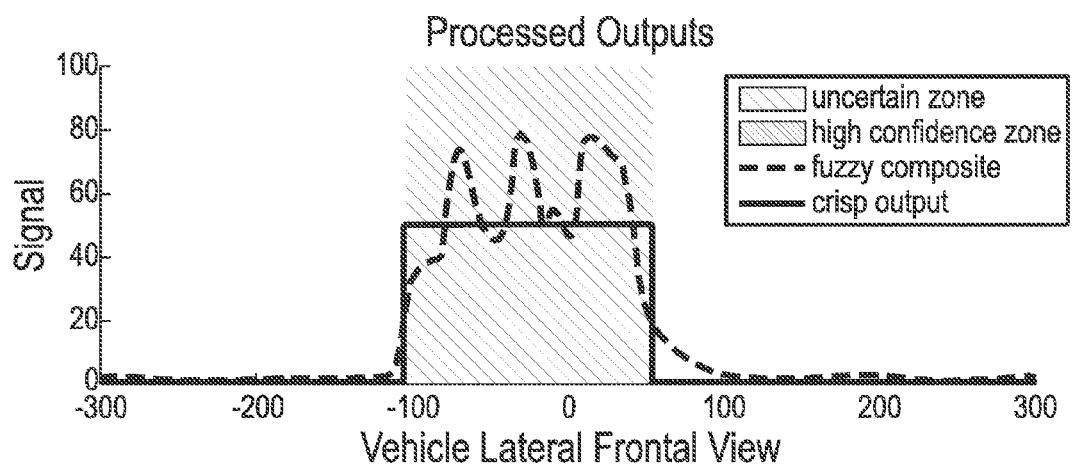

FIG. 6A illustrates another example vehicle 101 sensing an object that is less well defined because the quality of the data 115 collected by the data collectors 110 is low. FIG. 6B shows that the raw data collector 110 inputs are lower than the inputs shown in FIG. 5B, indicating that the confidence of the signals is lower. FIG. 6C illustrates the lower confidence, as the fuzzy composite of the signals is lower, the crisp output stays at 50, and thus FIG. 6C only shows an uncertain zone, and no high confidence zone. As a result, the computer 105 may not confidently identify the approaching object, shown in FIG. 6A as an amorphous shape. The autonomous confidence factor of FIGS. 6A-6C may be lower than the autonomous confidence AC factor of FIGS. 5A-5C as a result.

Figure 7A:
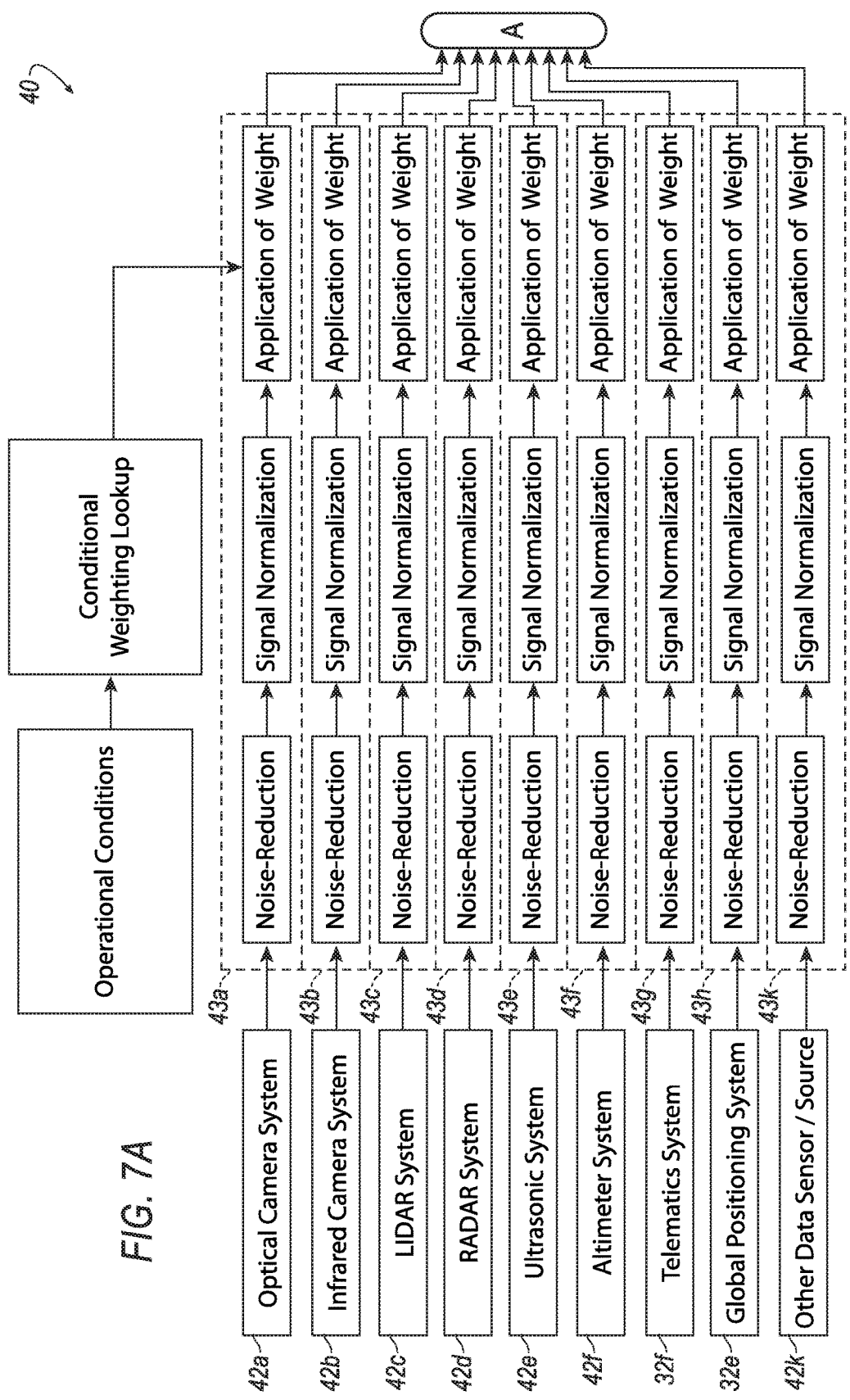
FIGS. 7A-7B are diagrams of the processing subsystem of FIG. 4.
Figure 7B:
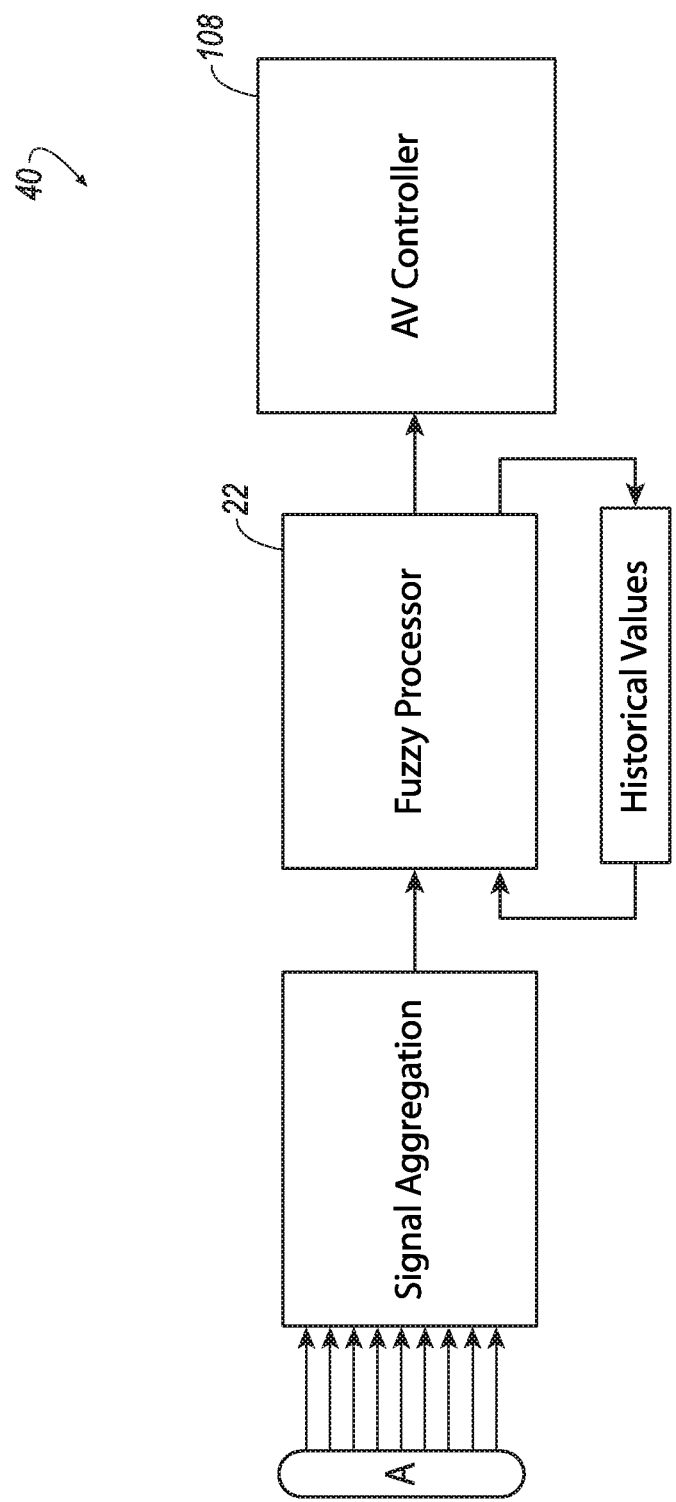

FIGS. 7A-7B illustrate the subsystem 40 and the processing of the data 115 from the component subsystems 42a-42k, 32e-32f into the autonomous confidence factor AC. The subsystem 40 feeds collected data 115 to a noise-reduction process where the data 115 are cleaned according to known noise reduction methods. Reducing the noise increases the quality of the data 115 and the autonomous confidence factor AC.

The subsystem 40 then applies a signal normalization process to the data 115. The data 115 may be collected according to several scales and units, depending on the specific component subsystem 42a-42k, 32e-32f. For example, an altimeter system 42f collects data 115 in terms of, e.g., meters vertically above the ground, and the ultrasonic system 42e may collect data 115 as length in three dimensions and/or in polar coordinates. Because the raw data 115 from these component subsystems 42a-42k, 32e-32f may not be able to be combined, the subsystem 40 applies the known signal normalization process to allow the data 115 to be combined into the autonomous confidence factor AC.

The subsystem 40 then applies the weights a $D_i$, as described above to determine the component confidence factors 43a-43k. The weights a $D_i$ may be determined by, e.g., operational conditions that are applied to a conditional weighting lookup table. Each component subsystem 42a-42k, 32e-32f has an individualized weight $D_i$ applied to it as determined by the lookup table. The data 115 are then aggregated and sent to the fuzzy process 22 to determine the autonomous confidence factor AC, which is used by the controller 108 to control the vehicle 101.

Figure 7C:
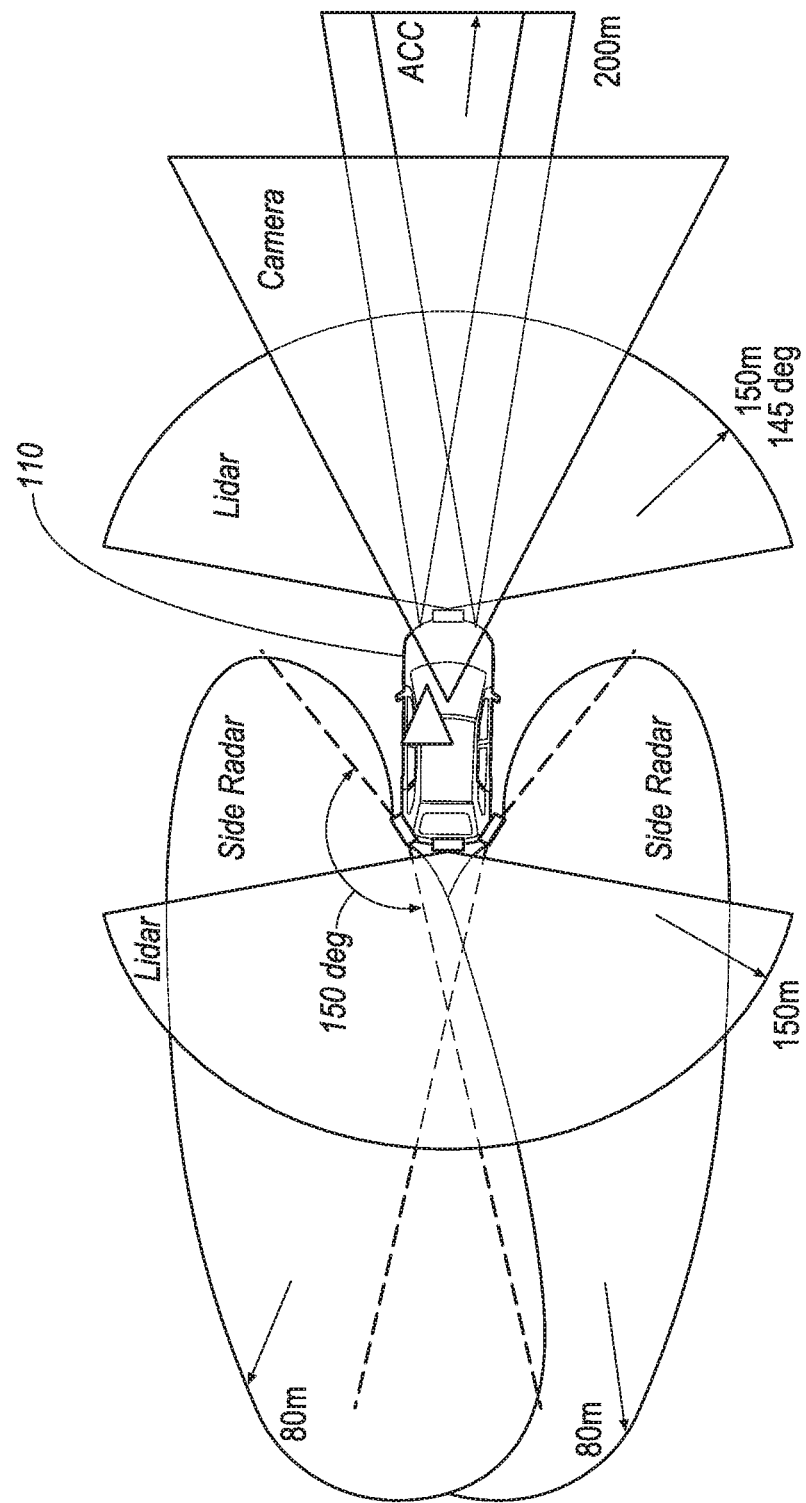
FIG. 7C illustrates an example vehicle and example ranges of data collectors.

FIG. 7C illustrates example data collectors 110 collecting data 115 from around the vehicle 101. The data 11 are used by, e.g., an adaptive cruise control (ACC) subsystem to plan movement of the vehicle 101 over, e.g., the next 200 meters. Each data collector 110 has a specific collection area defined by the angle that the collector 110 can detect and the distance along the angle. For example, the lidar subsystem 42c, shown on the front and rear of the vehicle 101, sweeps out a view of 145 degrees and a distance of 150 meters. Thus, the two lidar subsystems 42c do not overlap their detectable views. Similarly, the optical camera 42a extends out from the front of the vehicle 101, overlapping with the front lidar 42c. The side radars 42d, positioned on the rear of the vehicle 101, sweep out a 150 degree view and a distance of 80 meters. Because the side radars 42d are positioned on the rear of the vehicle opposite one another, the detection zones of the side radars 42d will not only overlap with each other, but with the rear lidar 42c as well.

Thus, various data collectors 110 will overlap with other data collectors 110, and certain areas around the vehicle 101 will have more coverage than others. As shown in FIG. 7C, the area to the front of the vehicle 101 is covered by both the lidar 42c and the optical camera 42a, while the side of the vehicle 101 is only covered by the side radar 42d. The confidence and weighting of the data 115 collected by the data collectors 110 may be adjusted based on where the data 115 were collected and whether other data collectors 110 covered the same area.

Figure 8A:
FIG. 8A is a table of data collected and processed by the processing subsystem of FIG. 4 to determine the autonomous confidence factor.

FIG. 8A illustrates an example chart showing data collected by one of the data collectors 110 and converted into a quality factor, as described above in Table 4. The data 115 may be collected as a series of discrete signals $d_1 \ldots d_n$ and combined into a raw composite signal $d_k$. The raw signal $d_k$ is then filtered into a filtered signal, which is then normalized. The quality factor (i.e., weighting factor), as described above, is then applied to the normalized signal to produce a qualified signal (i.e., a component factor).

Figure 8B:
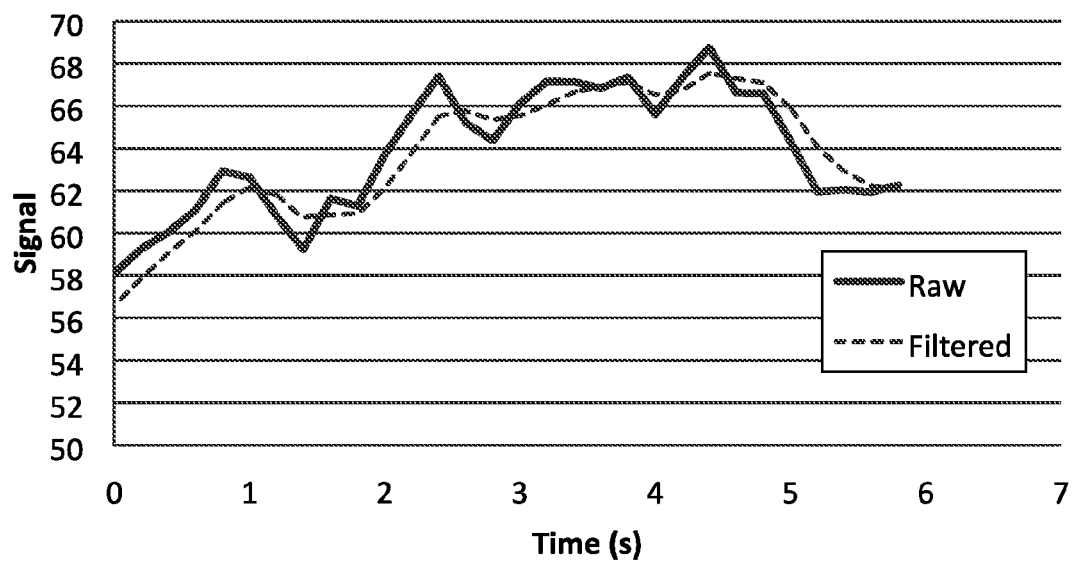
FIGS. 8B-8C illustrate the data from the chart of FIG. 8A.

FIG. 8B illustrates an example chart of the raw and filtered signals from the chart of FIG. 8A. The vertical axis shows the value of the signal, and the horizontal axis shows the time of the signal value. The raw signal $d_k$, shown in the solid line, has several sharp peaks and greater fluctuations, which may result in a less accurate confidence factors. The filtered signal, shown in the dashed line, is smoother and may be more easily processed by the subsystem 40 to determine the autonomous confidence factor AC. The filtered signal generally tracks the shape of the raw signal.

Figure 8C:
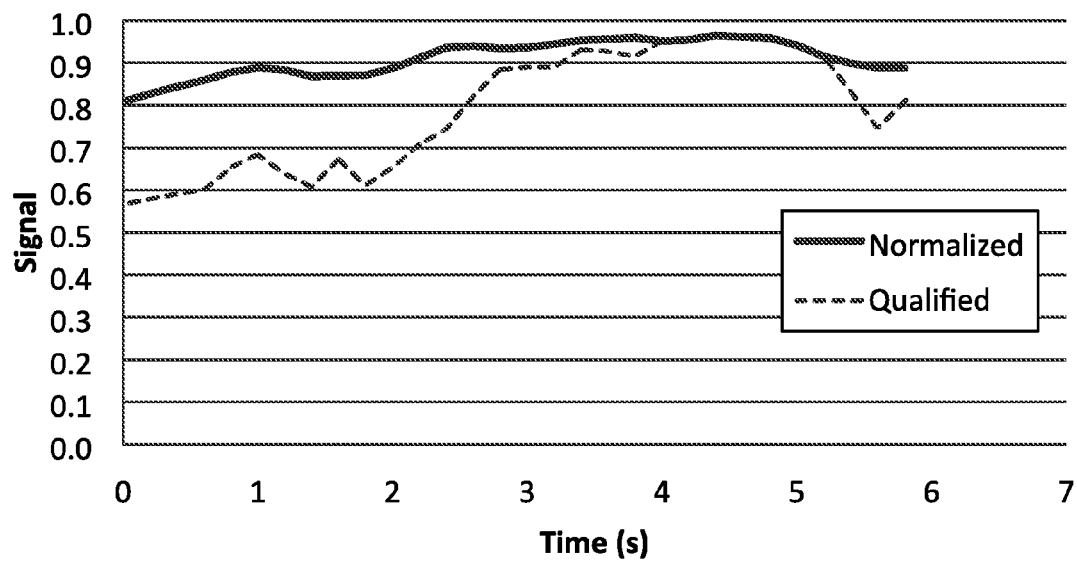

FIG. 8C illustrates an example chart of the normalized output and the qualified output from the chart of FIG. 8A. The vertical axis shows the value of the output, and the horizontal axis shows the time of the output. The normalized output, shown in the solid line, is the filtered signal normalized to minimum and maximum values for the signal, as described above. The qualified output is the normalized output multiplied by the quality factor, as determined by, e.g., a lookup table. Because the quality factor may change over time, the qualified output may differ in shape compared to the normalized output. Here, the normalized output remains roughly the same over the elapsed time, while the qualified output starts low and then rises. The qualified output may indicate, here, that the confidence in the collected data rises over time, and that the confidence factor AC may change during operation of the vehicle 101.

Peril Factor

An example of determining the peril factor PE is shown in Table 5 below:

TABLE 5

| OBJECT | Dynamics | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1.0 |
| Vehicle | 0.2 | 0.2 | 0.5 | 0.5 | 0.6 | 0.7 | 0.8 | 0.8 | 0.9 | 1.0 |
| Tree | 0.2 | 0.2 | 0.2 | 0.2 | 0.5 | 0.5 | 0.6 | 0.6 | 0.9 | 1.0 |
| Cyclist | 0.2 | 0.2 | 0.5 | 0.5 | 0.6 | 0.7 | 0.8 | 0.8 | 0.9 | 1.0 |
| Sign | 0.2 | 0.2 | 0.2 | 0.4 | 0.6 | 0.6 | 0.7 | 0.7 | 0.7 | 0.7 |
| Pothole | 0.2 | 0.2 | 0.2 | 0.3 | 0.3 | 0.4 | 0.5 | 0.5 | 0.6 | 0.6 |
| Brush | 0.0 | 0.0 | 0.0 | 0.0 | 0.0 | 0.0 | 0.1 | 0.1 | 0.2 | 0.3 |

The first row ("Dynamics") indicates the dynamics factor, i.e., the probability of a collision between the host vehicle and an object, e.g., another vehicle, a tree, a cyclist, a road sign, a pothole, or a patch of brush. Each row indicates a particular object and the peril factor as determined for each probability of collision. As a collision becomes more likely, the peril factor increases. For example, a probability of 0.6 of collision with a tree results in a peril factor of 0.5, while a probability of 0.1 of collision with a road sign results in a peril factor of 0.2. The object may be determined by the data collectors 110, e.g. a radar, and the probability may be determined in a known manner by the computer 105.

Based on the peril factor, the computer 105 may recommend switching between manual and autonomous operation states, as shown in Table 6:

TABLE 6

| OBJECT | Dynamics | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1.0 |
| Vehicle | D | D | D | D | D | AV | AV | AV | AV | AV |
| Tree | D | D | D | D | D | D | D | AV | AV | AV |
| Cyclist | D | D | AV | AV | AV | AV | AV | AV | AV | AV |
| Sign | D | D | D | D | D | D | AV | AV | AV | AV |
| Pothole | D | D | D | D | D | D | D | AV | AV | AV |
| Brush | D | D | D | D | D | D | D | D | D | D |

Here, based on the probability and the specific object, the computer 105 may determine whether to allow operator control (D) or autonomous control (AV). The determination in Table 6 is based at least in part on the peril factor, but may consider other factors and the object when determining the control. For example, a probability of 0.5 of a collision with a cyclist and a road sign both have a peril factor of 0.6, but Table 6 produces a determination of AV for the cyclist and D for the road sign.

If there are multiple objects having different peril factors and/or control determinations may be arbitrated in the computer 105. To continue with the above example, if the dynamics factor for a cyclist and a road sign are both 0.5, the computer 105 may determine to allow operator control based on the road sign but autonomous control based on the cyclist. The computer 105 may then arbitrate between these two determinations, e.g., selecting the autonomous control.

Figure 9:
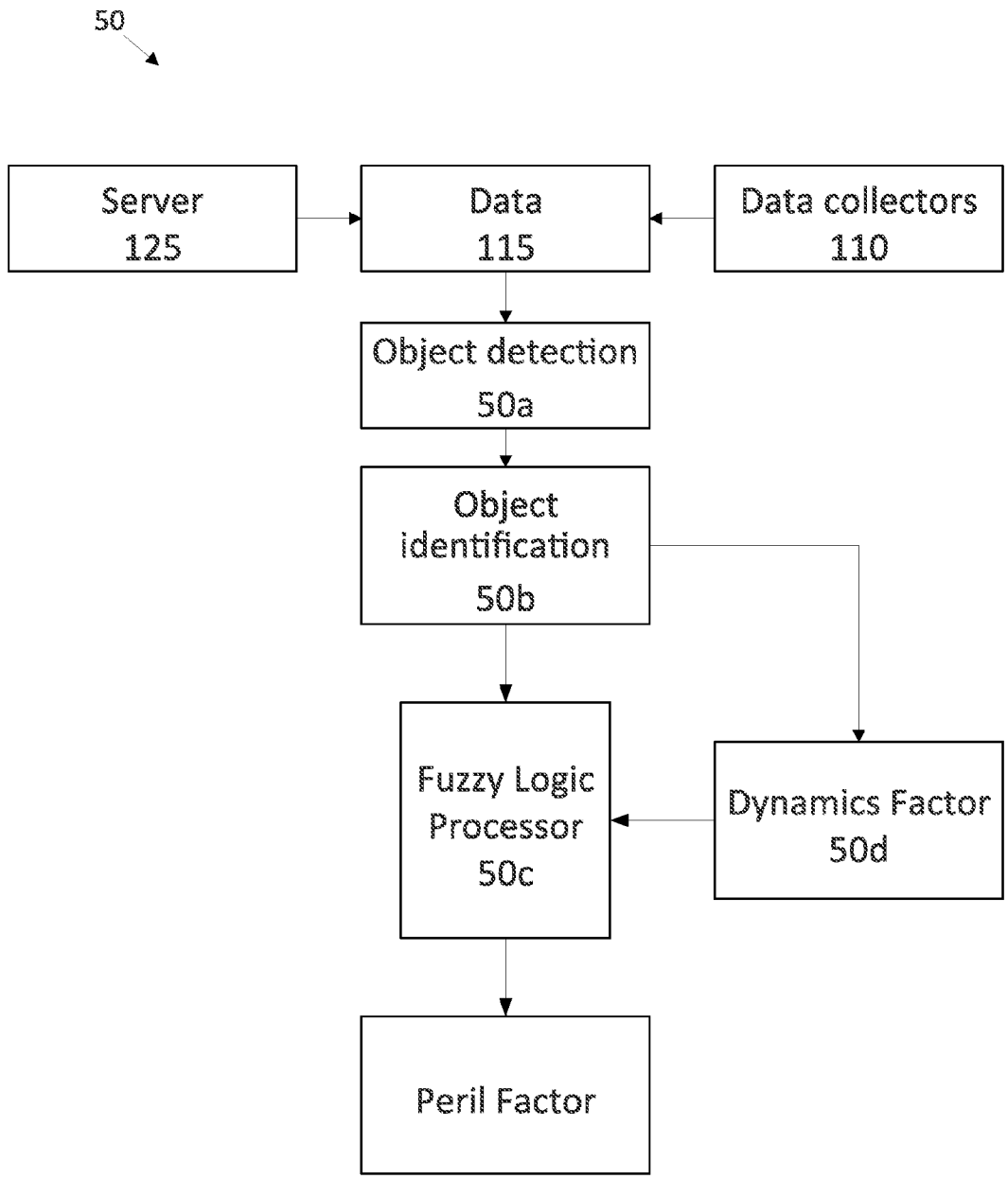
FIG. 9 is a diagram of another processing subsystem that could be implemented in the context of the system of FIG. 1 to determine a peril factor.

FIG. 9 illustrates a subsystem 50 for determining the peril factor. An object detection subsystem 50a obtains data 115 from data collectors 110 and the server 125 to detect nearby objects, e.g., other vehicles 101, cyclists, brush, etc. Upon detecting the objects, an object identification subsystem 50b identifies the objects to determine the specific dynamics and peril factors for the objects. The object identification subsystem 50b sends the identified objects to a fuzzy logic processor 50c and a dynamics factor subsystem 50d.

The fuzzy logic processor 50c determines the peril factor PE from the objects identified by the object identification subsystem 50b and the dynamics factor subsystem 50d, as described above. The fuzzy logic processor 50c may use a plurality of data 115 sources and techniques to determine the peril factor PE, including, e.g., historical data 115, known fuzzy logic methods, on-board learning techniques, external data 115 from a server 125 relating to traffic, etc. The fuzzy logic processor 50c may provide the peril factor PE to one of the controllers 108 to determine autonomous control of the vehicle 101.

Figure 2:
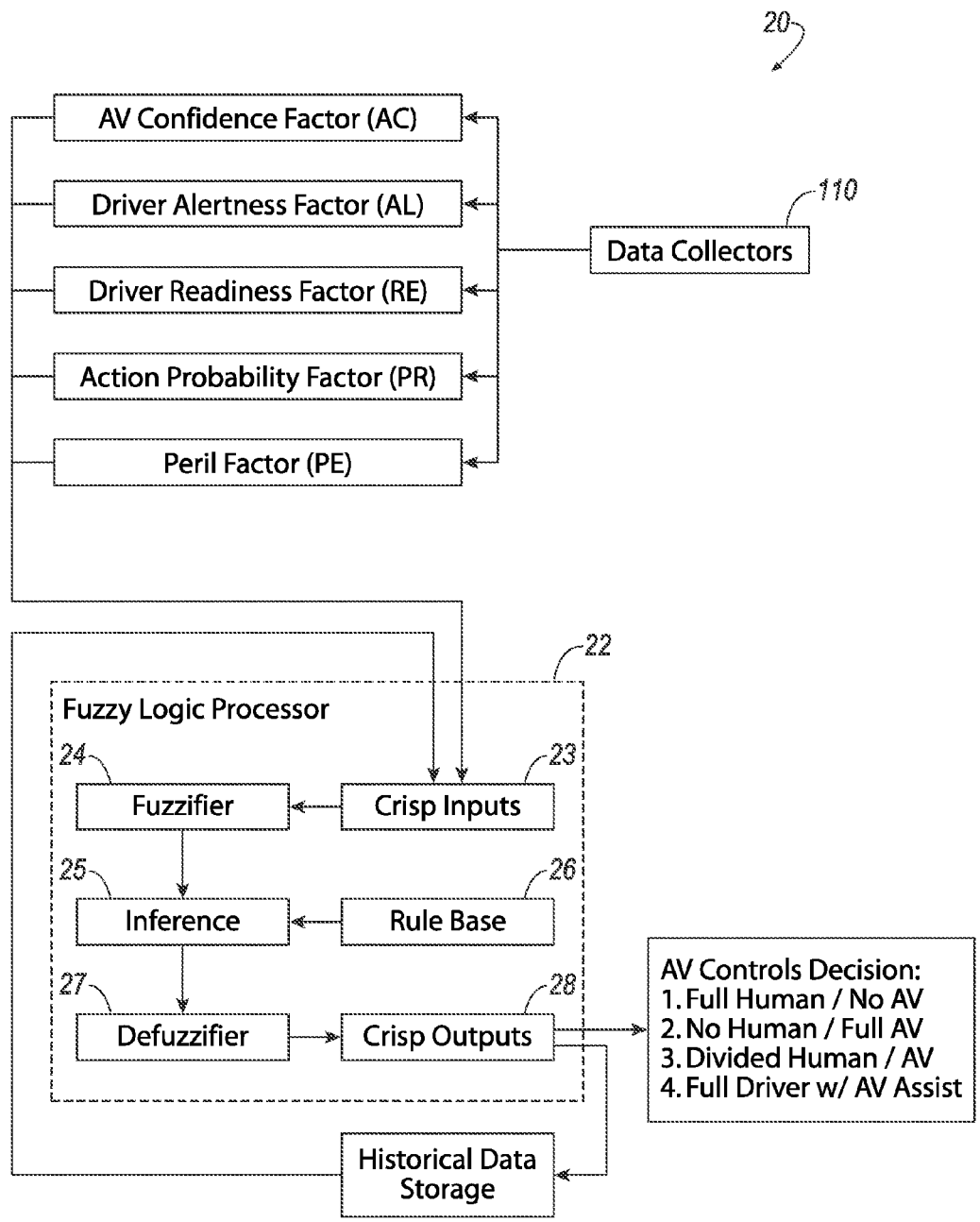
FIG. 2 is a diagram of a processing subsystem that could be implemented in the context of the system of FIG. 1.

FIG. 2 illustrates the system 100 collecting data 115 and outputting a control decision output for the vehicle 101. The computing device 105 collects data 115 from data collectors 110 and calculates the operational factors. The computing device 105 then uses the operational factors as crisp inputs 23 into a fuzzy processor 22 implementing a fuzzy logic analysis. The computing device 105 then applies a fuzzifier 24, i.e., a set of instructions that convert crisp inputs 23 into inputs that can have fuzzy logic applied to them, to create fuzzy inputs. For example, the fuzzifier 24 may apply weights to convert binary operational factors to various real numbers between zero and one. The computing device 105 then uses an inference engine 25 to infer a control decision output based on the fuzzified factors and a rule base 26 stored in the data store 106. The rule base 26 determines the control decision output based on, e.g., weighted operational factors. The computing device 105 then applies a defuzzifier 27, i.e., a set of instructions that convert the fuzzy control decision output into a crisp output decision 28. The crisp output decision 28 may be one of four decisions: full human operator control, full virtual operator control, shared human and virtual control, and human control with virtual assist, as described above. The computing device 105 then saves the crisp output decision 28 in the data store 106 as historical data and actuates one or more vehicle 101 components based on the crisp output decision 28.

Exemplary Process Flows

Figure 14:
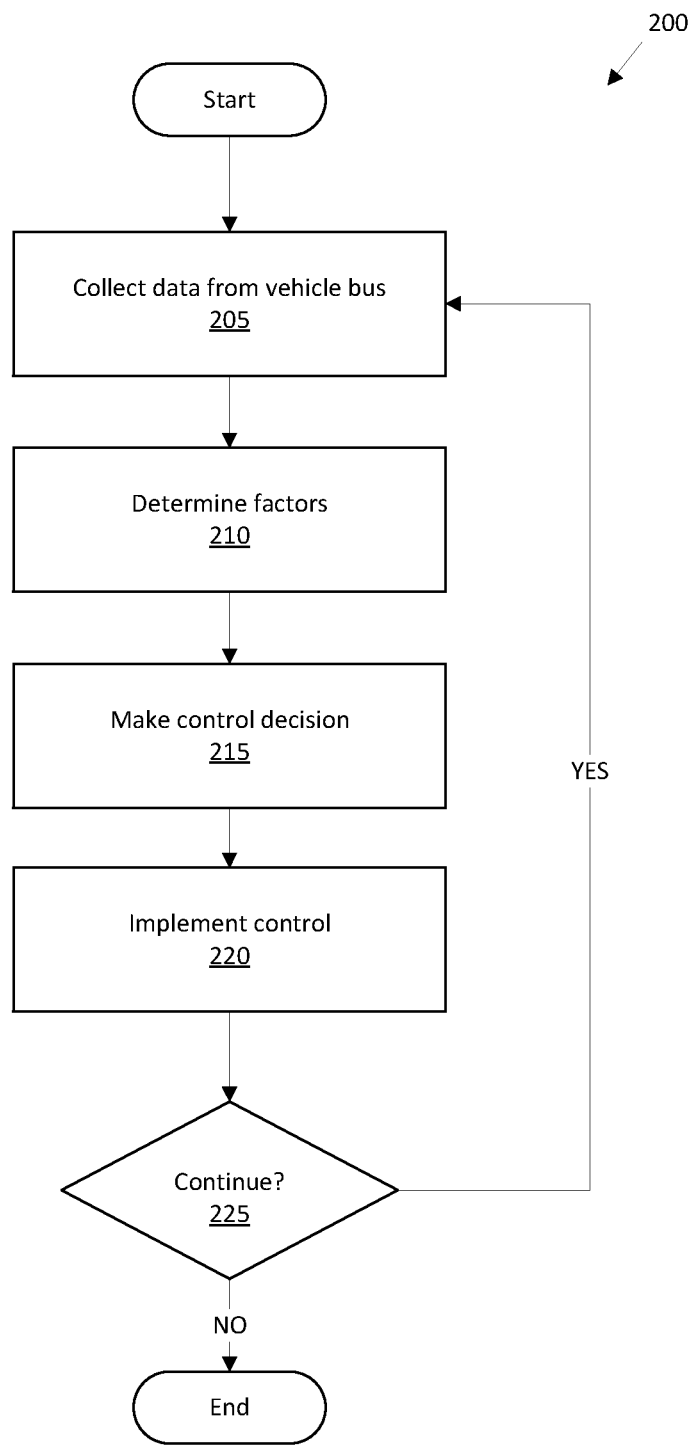
FIG. 14 is a diagram of an exemplary process for implementing operation control of a vehicle.

FIG. 14 is a diagram of an exemplary process 200 for implementing control of an autonomous vehicle 101 based on the operational factors described above.

The process 200 begins in a block 205, in which a vehicle 101 conducts driving operations, and the computer 105 receives data 115 from vehicle 101 operations and/or concerning a vehicle 101 user, e.g., a person seated in a driver's seat. The vehicle 101 can be operated partially or completely autonomously, i.e., a manner partially or completely controlled by the computer 105, which may be configured to operate the vehicle 101 according to collected data 115. For example, all vehicle 101 operations, e.g., steering, braking, speed, etc., could be controlled by the computer 105. It is also possible that, in the block 205, the vehicle 101 may be operated in a partially or semi-autonomous, i.e., partially manual, fashion, where some operations, e.g., braking, could be manually controlled by a driver, while other operations, e.g., including steering, could be controlled by the computer 105. Likewise, the computer 105 could control when a vehicle 101 changes lanes. Further, it is possible that the process 200 could be commenced at some point after vehicle 101 driving operations begin, e.g., when manually initiated by a vehicle occupant through a user interface of the computer 105.

In any event, data collectors 110 provide to the computer 105 collected data 115. For example, camera data collectors 110 may collect image data 115, an engine control unit may provide RPM data 115, a speed sensor 110 may provide speed data 115, as well as other kinds of data, e.g., radar, lidar, acoustic, etc., data 115. Further, data concerning a vehicle 101 user, e.g., for factors AL and RE and/or other operating factors, as discussed above, may be obtained and provided to the computer 105.

Next, in a block 210, the computer 105 determines one or more operational factors, e.g., the alertness factor AL, the readiness factor RE, the autonomous confidence factor AC, the action probability factor PR, and the peril factor PE, as described above. The computer 105 may determine only one of the factors, e.g., the autonomous confidence factor as shown in FIG. 4, or a combination of factors, e.g., a combination of the alertness factor AL and the readiness factor RE as shown in FIG. 3.

Next, in a block 215, the computer 105 makes a control decision for the vehicle 101 based on the operational factors determined in the block 210. That is, the computer 105 determines a level of permitted autonomous control, generally ranging from no autonomous control (full manual control) to full autonomous control (all operations relating to braking, propulsion, and steering are performed according to instructions from the computer 105). As discussed above, between a level of no autonomous control and a level of full autonomous control, other levels are possible, e.g., a first level of autonomous control could include full autonomous control, a second level of autonomous control could include the computer 105 controlling breaking and propulsion, but not steering, a third level of autonomous control could include the computer 105 controlling braking but not acceleration or steering, and no autonomous control, a fourth level, could include the computer 105 controlling none of braking, acceleration or steering.

The control decision may be made according to programming that implements a fuzzy logic analysis. For example, operational factors could be determined as described above, and then provided to the computer 105 for inputs to the fuzzy logic analysis. That is, crisp inputs of zero or one could be provided for one or more of the operational factors, e.g., an autonomous confidence factor, and operator alertness factor, and operator readiness factor, and operator action probability factor, and a peril factor, and these inputs could then be subjected to fuzzification, e.g., weights could be applied as described above to convert binary operational factors to various real numbers between zero and one.

Further, other data could be provided to the computer 105 for the control decision. For example, data concerning vehicle 101 operation, such as a vehicle 101 speed, a risk analysis from a collision detection system (e.g., data that a collision is imminent, possible within a projected period of time, e.g., five seconds, 10 seconds, etc. or not imminent), vehicle 101 steering wheel angle, data concerning a roadway in front of the vehicle 101 (e.g., presence of potholes, bumps, or other factors that could affect the vehicle 101 and its operation), etc.

In any case, an inference engine could use a rule base to evaluate the fuzzified operational factors and/or other data. For example, thresholds could be applied to operational factors as described above. Further, an inference engine could apply rules to set thresholds according to various vehicle 101 operating data, e.g., thresholds may vary depending on environmental conditions around the vehicle 101 (e.g., presence of daylight or darkness, presence of precipitation, type of precipitation, type of roadway being traveled, etc.), a speed of the vehicle 101, a risk of an imminent collision, a likelihood of roadway obstacles, e.g., potholes, etc. Various operator states could also be considered, e.g., a determination that an operator was inebriated could override all other determinations of operator readiness, e.g., an operator readiness factor could be set to zero, and/or only full autonomous control could be allowed.

In any case, the result of the block 215 is a control decision, e.g., a determination by the computer 105 of a level of autonomous control permissible in the vehicle 101, e.g., ranging from full autonomous control to no autonomous control.

Next, in the block 220, the computer 105 implements the control decision output in the block 215. That is, the computer 105 is programmed to actuate one or more vehicle 101 components as described above, and upon the control decision of the block 215, performs operations of the vehicle 101 according to an indicated level of autonomous control. For example, at a full level of autonomous control, the computer 105 implements the control decision of the block 215 by controlling each of vehicle 101 propulsion, braking, and steering. As described above, the computer 105 could implement the control decision by controlling none or some of these components. Further, if a decision is made to partially or fully autonomously operate the vehicle 101, but autonomous confidence factor is below a predetermined threshold and/or it is determined for some other reason that autonomous operation is not possible, the computer 105 may be programmed to stop the vehicle 101, e.g., to execute a maneuver to pull the vehicle 101 to a roadway shoulder and park, to pull off the highway, etc.

Next, in a block 225, the computer 105 determines whether the process 200 should continue. For example, the process 200 may end if autonomous driving operations, e.g., the vehicle 101 is powered off, a transmission selector is placed in "park," etc. In any case, if the process 200 should not continue, the process 200 ends following the block 225. Otherwise, the process 200 proceeds to the block 205.

Figure 15:
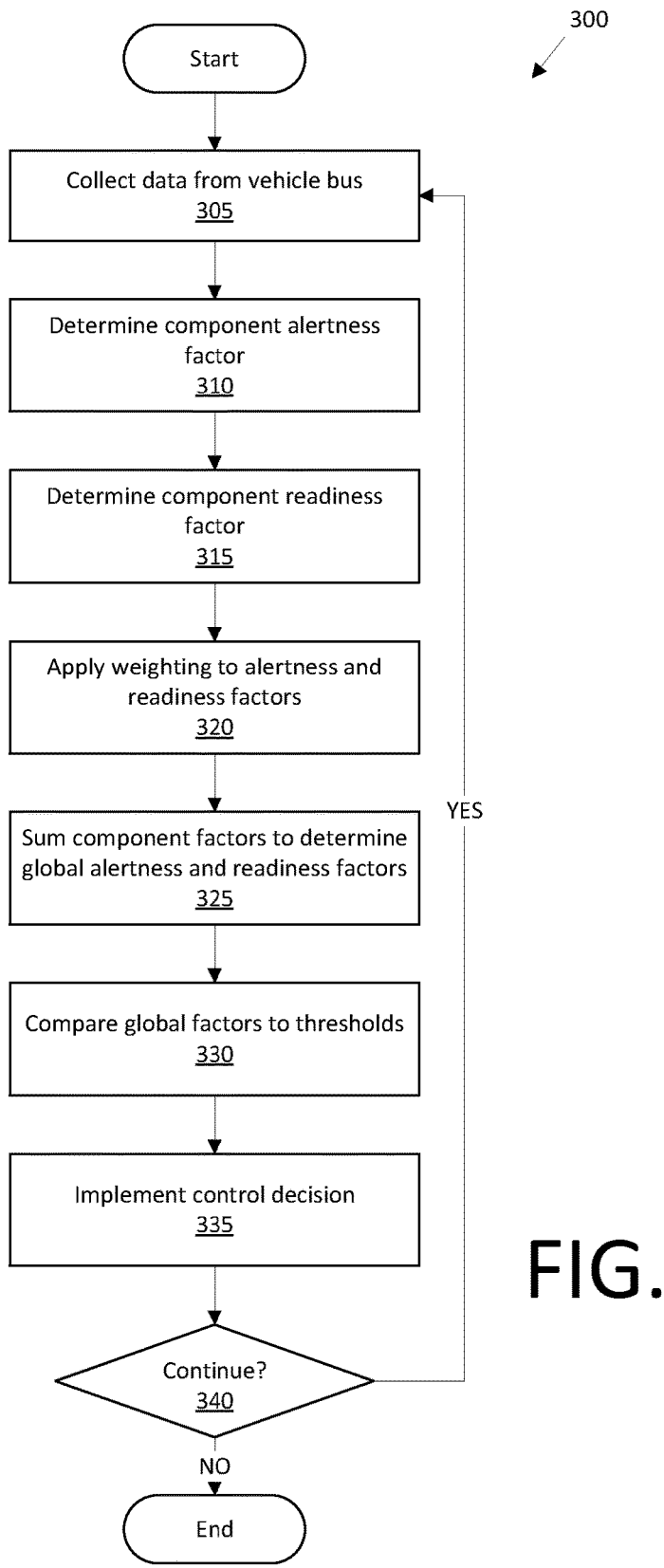
FIG. 15 is a diagram of another exemplary process for implementing operation control of a vehicle based on an alertness factor and a readiness factor.

FIG. 15 illustrates a process 300 for implementing control of a vehicle 101 based on the alertness factor AL and readiness factor RE.

The process 300 begins in a block 305, in which a vehicle 101 conducts driving operations, and the computer 105 receives data 115 from vehicle 101 operations and/or concerning a vehicle 101 user, e.g., a person seated in a driver's seat. It is possible that the process 300 could be commenced at some point after vehicle 101 driving operations begin, e.g., when manually initiated by a vehicle occupant through a user interface of the computer 105.

Data collectors 110 provide to the computer 105 collected data 115. For example, camera data collectors 110 may collect image data 115, an engine control unit may provide RPM data 115, a speed sensor 110 may provide speed data 115, as well as other kinds of data, e.g., radar, lidar, acoustic, etc., data 115. Further, data concerning a vehicle 101 user, e.g., for factors AL and RE, as discussed above, may be obtained and provided to the computer 105.

Next, in a block 310, the computing device 105 determines a component alertness factor $AL_i$ for a plurality of inputs, as described above and shown in Table 2.

Next, in a block 315, the computing device 105 determines a component readiness facto $RE_i$ for a plurality of inputs, as described above and shown in Table 2.

Next, in a block 320, the computing device 105 applies a weighting factor to the component alertness and readiness factors. The weighting factor may be determined by, e.g., a fuzzy logic processor that weights the component alertness and readiness factors, as described above.

Next, in a block 325, the computing device 105 sums the component factors into respective global alertness and readiness factors AL, RE. The global alertness and readiness factors may be used to determine an overall alertness and readiness for the vehicle 101 and the occupant.

Next, in a block 330, the computing device 105 compares the alertness and readiness factors AL, RE to respective alertness and readiness thresholds. The thresholds may be predetermined and stored in the data store 106. The thresholds may be determined based on, e.g., a particular occupant's ability to operate the vehicle 101, as described above. The factors AL, RE may be compared to several predetermined thresholds defining different levels of autonomous operation.

Next, in a block 335, the computing device 105 implements a control decision based on the factors and the thresholds. That is, the computer 105 is programmed to actuate one or more vehicle 101 components as described above, and upon the control decision of the computing device 105, performs operations of the vehicle 101 according to an indicated level of autonomous control. For example, if the alertness factor is above a highest alertness threshold, the computing device may implement a control decision to allow full manual control of the vehicle 101.

Next, in a block 340, the computer 105 determines whether the process 300 should continue. For example, the process 300 may end if autonomous driving operations, e.g., the vehicle 101 is powered off, a transmission selector is placed in "park," etc. If the process 300 should not continue, the process 300 ends following the block 340. Otherwise, the process 300 proceeds to the block 305.

Figure 16:
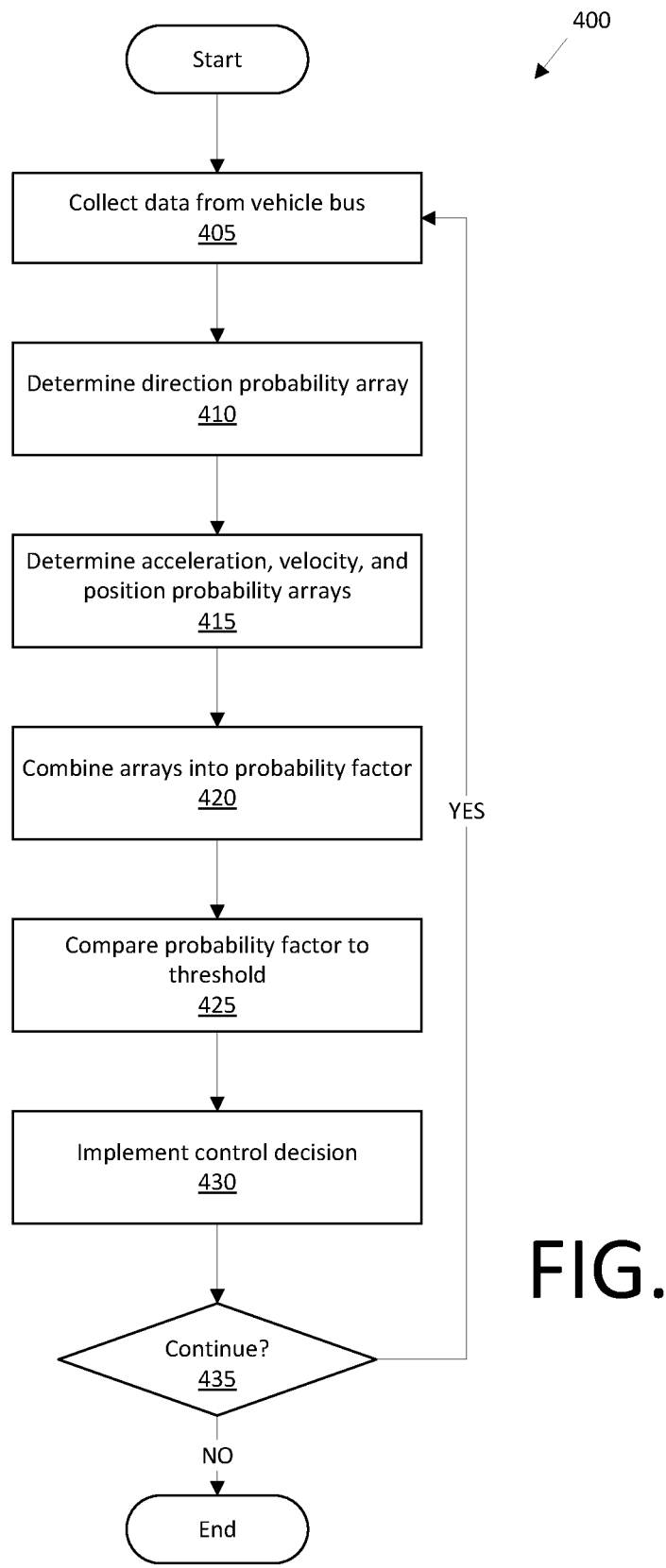
FIG. 16 is a diagram of another exemplary process for implementing operation control of a vehicle based on an action probability factor.

FIG. 16 illustrates a process 400 for implementing control of a vehicle 101 based on the action probability factor PR.

The process starts in a block 405, where the computer 105 receives data 115 from vehicle 101 operations and/or concerning a vehicle 101 user and/or concerning a target object. The data 115 may include data 115 from sources such as, e.g., an optical camera subsystem, an infrared camera subsystem, a lidar, a radar, a telematics subsystem, a route recognition subsystem, etc.

Next, in a block 410, the computer 105 determines a directional probability array based on the data 115. The directional probability array, as described above, indicates the likelihood of the vehicle 101 to move from its current trajectory by an angle θ. The directional probability array may include component directional probability arrays, as shown in FIG. 12, including the object-based directional probability array, the route-based directional probability array, the vehicle-based directional probability array, and historical data. The component directional probability arrays may be combined into an overall directional probability array, as described above.

Next, in a block 415, the computer 105 determines probability arrays for the vehicle 101 acceleration, velocity, and position, as described above. The several probability arrays predict the state of the vehicle 101 and may be combined to determine a global probability array.

Next, in the block 420, the computer 105 collects the probability arrays into and determines an action probability factor PR. The computer 105 may compare the one or more of the probability arrays to at least one of a probability array in a predetermined "safe" state and to data 115 related to the peril factor to determine the action probability factor.

Next, in a block 425, the computer 105 compares the probability factor PR to a predetermined threshold. Depending on whether the probability factor PR exceeds the threshold, the compute 105 may allow or force autonomous control of vehicle 101 subsystems.

Next, in a block 430, the computer 105 implements a control decision based on the action probability factor and the threshold. That is, the computer 105 is programmed to actuate one or more vehicle 101 components as described above, and upon the control decision of the computing device 105, performs operations of the vehicle 101 according to an indicated level of autonomous control. For example, if the action probability factor is below the probability factor threshold, the computing device may implement a control decision to allow full manual control of the vehicle 101.

Next, in a block 435, the computer 105 determines whether the process 400 should continue. For example, the process 400 may end if autonomous driving operations, e.g., the vehicle 101 is powered off, a transmission selector is placed in "park," etc. If the process 400 should not continue, the process 400 ends following the block 435. Otherwise, the process 400 proceeds to the block 405.

Figure 17:
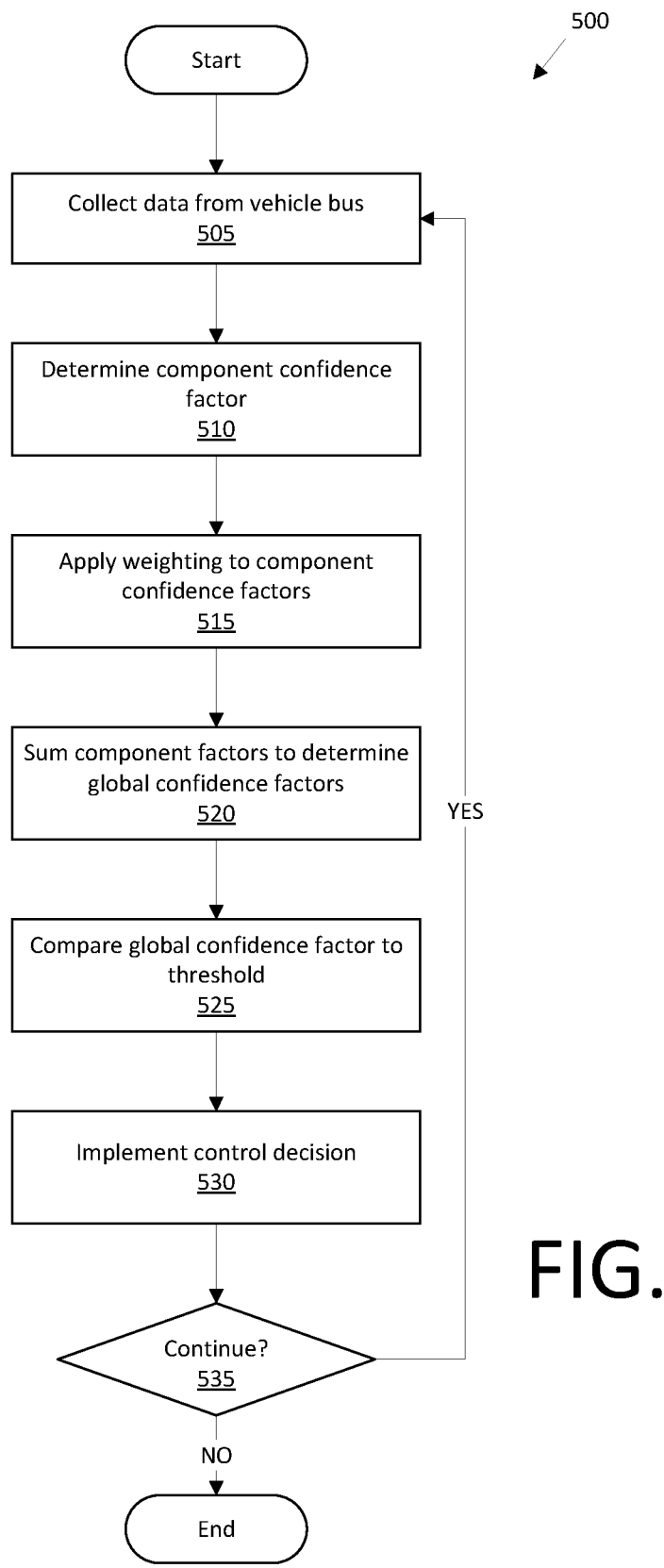
FIG. 17 is a diagram of another exemplary process for implementing operation control of a vehicle based on an autonomous confidence factor.

FIG. 17 illustrates a process 500 for implementing control of a vehicle 101 based on the autonomous confidence factor AC.

The process 500 begins in a block 505 where the computer 105 collects data 115 from a plurality of sources, e.g., an optical camera subsystem, an infrared camera subsystem, etc.

Next, in a block 510, the computer 105 determines component confidence factors for a plurality of vehicle 101 components based on the data 115. As described above, the computer may determine a confidence factor for each of a plurality of vehicle 101 components, indicating the confidence that the component can be operated in an autonomous mode.

Next, in a block 515, the computer applies a weighting to the component confidence factors. The weighting may be determined by a fuzzy logic processor, as is known. The weighting allows the computer 105 to consider the confidence factor of certain vehicle 101 components with greater weight than the confidence factor of other vehicle 101 components. For example, a lidar subsystem may have a higher weighting than an altimeter subsystem when the computer 105 determines that confidence in the lidar subsystem is more crucial to autonomous operation of the vehicle 101 than confidence in the altimeter subsystem.

Next, in a block 520, the computer 105 sums the component autonomous confidence factors into a global autonomous confidence factor AC.

Next, in a block 525, the computer 105 compares the global autonomous confidence factor AC to a predetermined threshold. The predetermined threshold may be selected based on the confidence that the vehicle 101 can operate at least one of its subsystems in an autonomous mode. The computer 105 may compare the global autonomous confidence factor to several predetermined thresholds.

Next, in a block 530, the computer 105 implements a control decision based on the comparison to the predetermined thresholds. For example, if the global autonomous confidence factor is above a first threshold, the computer 105 may operate all of the vehicle 101 subsystems in an autonomous mode. In another example, if the global autonomous confidence factor is below the first threshold but above a second threshold, the computer 105 may selectively operate certain vehicle 101 subsystems autonomously.

Next, in a block 535, the computer 105 determines whether the process 500 should continue. For example, the process 500 may end if autonomous driving operations, e.g., the vehicle 101 is powered off, a transmission selector is placed in "park," etc. If the process 500 should not continue, the process 500 ends following the block 535. Otherwise, the process 500 proceeds to the block 505.

Figure 18:
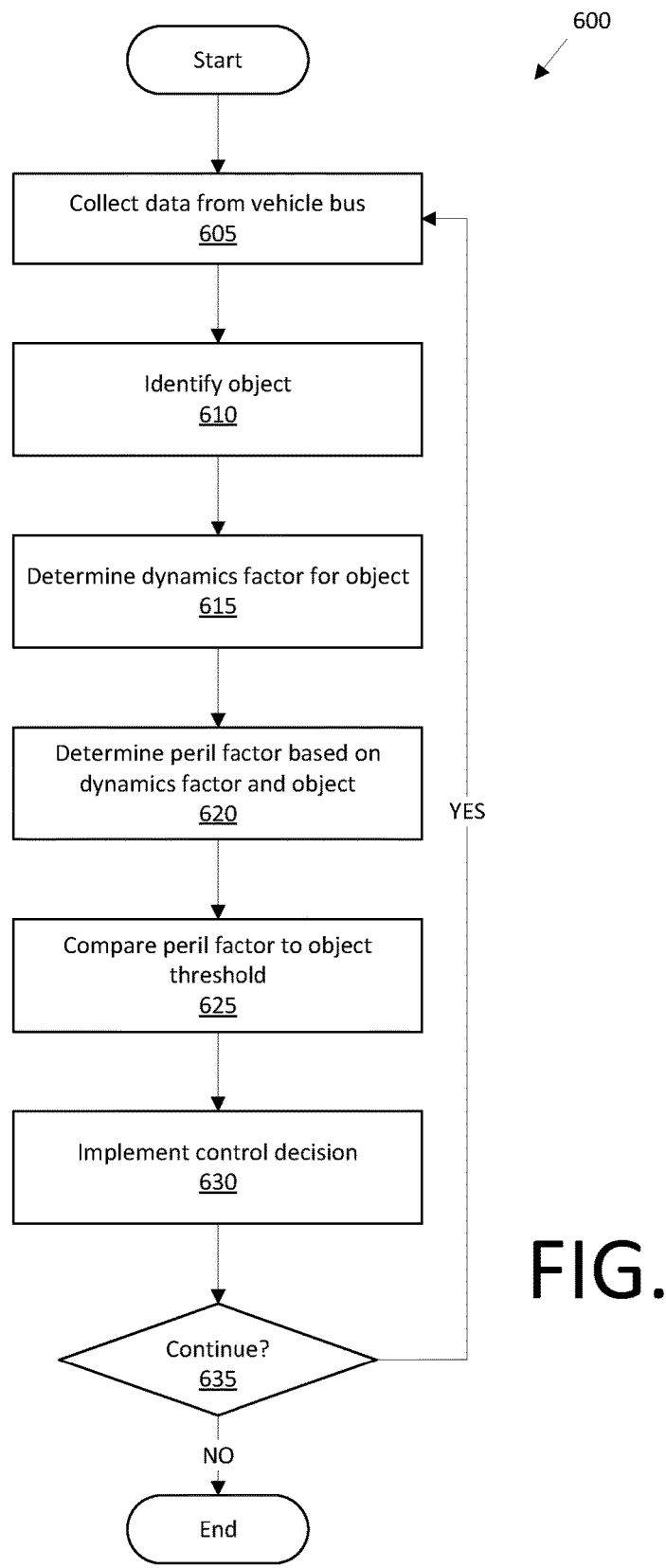
FIG. 18 is a diagram of another exemplary process for implementing operation control of a vehicle based on a peril factor.

FIG. 18 illustrates a process 600 for implementing control of a vehicle 101 based on the peril factor PE.

The process 600 starts in a block 605, where the computer 105 collects data 115 from a plurality of sources, e.g., vehicle 101 subsystems, surrounding objects, etc.

Next, in a block 610, the computer 105 identifies an object that has a probability to collide with the vehicle 101.

Next, in a block 615, the computer 105 determines a dynamics factor for the object. As described above, the dynamics factor is the likelihood that the object will collide with the vehicle 101.

Next, in a block 620, the computer 105 determines the peril factor PE based on the dynamics factor and the object. For example, as shown in Table 5 above, each of several objects has a unique peril factor for a particular dynamics factor. The computer 105 may use a look-up table like Table 5 to determine the peril factor PE. The peril factor accounts for both the likelihood of collision with the object and the harm that the object would cause upon collision; e.g., the peril factor for brush may be lower than the peril factor for a guard rail even at the same dynamics factor.

Next, in a block 625, the computer 105 compares the peril factor PE to a threshold. The threshold may determine whether to operate the vehicle 101 and/or specific vehicle 101 subsystems in an autonomous mode based on the risk of collision with the object and the damage the object would cause upon collision.

Next, in a block 630, the computer 105 implements a control decision based on the peril factor and the threshold. The computer 105 may use a look-up table such as Table 6 to determine whether to operate the vehicle 101 autonomously. For example, a peril factor of 0.5 would indicate autonomous control of the vehicle 101 if the object is a cyclist, but manual control of the vehicle 101 if the object is another vehicle 101.

Next, in a block 635, the computer 105 determines whether the process 600 should continue. For example, the process 600 may end if autonomous driving operations, e.g., the vehicle 101 is powered off, a transmission selector is placed in "park," etc. If the process 600 should not continue, the process 600 ends following the block 635. Otherwise, the process 600 proceeds to the block 605.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

Computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
   collecting data from each of a plurality of respective vehicle subsystems;
   determining a component confidence factor for each subsystem indicating a quality of the collected data from the respective subsystem based on the collected data and a weighting factor;
   determining a global autonomous confidence factor based at least in part on the component confidence factors; and
   transitioning between levels of autonomous control of the vehicle based at least in part on the global autonomous confidence factor.

2. The method of claim 1, wherein the levels include an autonomous, a semi-autonomous, and a manual level of control.

3. The method of claim 1, wherein the specific weighted factor for a respective subsystem is determined by a value of the collected data from the respective subsystem.

4. The method of claim 1, wherein the plurality of vehicle subsystems includes at least one of a lidar, a radar, an optical camera, an infrared camera, an ultrasonic transducer, an altimeter, a global position system, and a telematics system.

5. The method of claim 1, further comprising changing from a first one of the levels of autonomous control to a second one of the levels of autonomous control when the global autonomous confidence factor exceeds a first threshold.

6. The method of claim 5, further comprising changing to a semi-autonomous level of control when the global autonomous confidence factor is below the first threshold and exceeds a second threshold.

7. The method of claim 5, wherein the vehicle subsystems each have a specific autonomous confidence threshold, the method further comprising autonomously controlling each of the vehicle subsystems when a specific component confidence factor for the vehicle subsystem exceeds the specific autonomous confidence threshold and allowing manual control of each of the vehicle subsystems when the specific component confidence factor for the vehicle subsystem that is below the specific autonomous confidence threshold.

8. The method of claim 1, further comprising actuating at least one of vehicle steering, braking, and propulsion according to the global autonomous confidence factor.

9. The method of claim 1, wherein the autonomous control includes control of each of vehicle steering, braking, and propulsion by a vehicle computer, semi-autonomous control includes control of at least one of vehicle steering, braking, and propulsion by the vehicle computer, and manual control includes control of none of vehicle steering, braking, and propulsion by the vehicle computer.

10. An autonomous vehicle, comprising:
    a plurality of vehicle control subsystems; and
    at least one controller programmed to:
      collect data from each of the plurality of respective vehicle subsystems;
      determine a component confidence factor for each subsystem indicating a quality of the collected data from the respective subsystem based on the collected data and a weighting factor;
      determine a global autonomous confidence factor based at least in part on the component confidence factors; and
      between levels of autonomous control of the vehicle based at least in part on the global autonomous confidence factor.

11. The vehicle of claim 10, wherein the levels include an autonomous, a semi-autonomous, and a manual level of control.

12. The vehicle of claim 10, wherein the plurality of vehicle subsystems includes at least one of a lidar, a radar, an optical camera, an infrared camera, an ultrasonic transducer, an altimeter, a global position system, and a telematics system.

13. The vehicle of claim 11, wherein the controller is programmed to change from a first one of the levels of autonomous control to a second one of the levels of autonomous control when the global autonomous confidence factor exceeds a first threshold.

14. The vehicle of claim 13, wherein the controller is programmed to change to a semi-autonomous level of control when the global autonomous confidence factor is below the first threshold and exceeds a second threshold.

15. The vehicle of claim 13, wherein the vehicle subsystems each have a specific autonomous confidence threshold, the controller programmed to autonomously control each of the vehicle subsystems when a specific component confidence factor for the vehicle subsystem exceeds the specific autonomous confidence threshold and allowing manual control of each of the vehicle subsystems when the specific component confidence factor for the vehicle subsystem that is below the specific autonomous confidence threshold.

16. The vehicle of claim 10, wherein the controller is programmed to actuate at least one of vehicle steering, braking, and propulsion according to the global autonomous confidence factor.

* * * * *